(12) United States Patent
Nakajima

(10) Patent No.: US 9,760,804 B2
(45) Date of Patent: Sep. 12, 2017

(54) MARKER GENERATING AND MARKER DETECTING SYSTEM, METHOD AND PROGRAM

(71) Applicant: NEC Corporation, Tokyo (JP)

(72) Inventor: Noboru Nakajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/134,968

(22) Filed: Dec. 19, 2013

(65) Prior Publication Data

US 2016/0335525 A1 Nov. 17, 2016

Related U.S. Application Data

(62) Division of application No. 12/524,027, filed as application No. PCT/JP2008/050857 on Jan. 23, 2008, now Pat. No. 8,655,076.

(30) Foreign Application Priority Data

Jan. 23, 2007 (JP) .................................. 2007-012134
Jan. 11, 2008 (JP) .................................. 2008-003950

(51) Int. Cl.
G06K 9/00 (2006.01)
G06K 9/62 (2006.01)
(Continued)

(52) U.S. Cl.
CPC ....... *G06K 9/6267* (2013.01); *G06K 9/00758* (2013.01); *G06K 9/46* (2013.01);
(Continued)

(58) Field of Classification Search
CPC ................. G06K 9/4604; G06K 9/468; G06K 2009/0059; G06K 2009/3225
See application file for complete search history.

(56) References Cited

U.S. PATENT DOCUMENTS 5,412,487 A 5/1995 Nishimura et al.
7,110,591 B2 9/2006 Neubauer et al.
(Continued)

FOREIGN PATENT DOCUMENTS

CN 1585455 2/2005
JP 07-254037 10/1995
(Continued)

OTHER PUBLICATIONS

International Search Report—PCT/JP2008/050857—Feb. 26, 2008.
(Continued)

*Primary Examiner* — Gregory M Desire
(74) *Attorney, Agent, or Firm* — Young & Thompson

(57) ABSTRACT

[PROBLEMS TO BE SOLVED] It is an object to provide a marker and a marker generating and detecting technology that can automatically design a diagrammatic marker that is not similar to any patterns to appear during the reproduction of background video images. [MEANS FOR SOLVING THE PROBLEMS] A marker generating system is characterized in having a special feature extracting means that extracts a portion, as a special feature, including a distinctive pattern in a video image not including a marker; a unique special feature selecting means that, based on the extracted special feature, selects a special feature of an image, as a unique special feature, that does not appear on the video image; and a marker generating means that generates a marker based on the unique special feature.

12 Claims, 27 Drawing Sheets

(51) Int. Cl.
  *G06K 9/46* (2006.01)
  *G06T 7/60* (2017.01)
  *G06T 7/11* (2017.01)
  *G06T 7/41* (2017.01)
  *G06T 7/194* (2017.01)
  *G06K 9/32* (2006.01)

(52) U.S. Cl.
  CPC ............... *G06K 9/468* (2013.01); *G06T 7/11* (2017.01); *G06T 7/194* (2017.01); *G06T 7/41* (2017.01); *G06T 7/60* (2013.01); *G06K 2009/0059* (2013.01); *G06K 2009/3225* (2013.01); *G06T 2207/30204* (2013.01)

(56) References Cited

U.S. PATENT DOCUMENTS

| | | | |
|---|---|---|---|
| 7,536,045 | B2 | 5/2009 | Alessi et al. |
| 7,688,997 | B2 * | 3/2010 | Gibbins ............. G06K 9/00771 348/143 |
| 7,738,705 | B2 * | 6/2010 | Casadei ............... G06K 9/6206 382/181 |
| 7,809,194 | B2 * | 10/2010 | Zhang .................. G06K 9/4604 382/181 |
| 7,979,432 | B2 | 7/2011 | Momosaki et al. |
| 8,009,305 | B2 | 8/2011 | Ishikawa et al. |
| 2004/0151383 | A1 | 8/2004 | Alessi et al. |
| 2006/0047693 | A1 | 3/2006 | Kojima et al. |
| 2006/0280333 | A1 | 12/2006 | Ikeda et al. |
| 2012/0024953 | A1 | 2/2012 | Fan et al. |
| 2012/0114253 | A1 * | 5/2012 | Nakajima ............. G06K 9/468 382/201 |

FOREIGN PATENT DOCUMENTS

| | | |
|---|---|---|
| JP | 11-075095 | 3/1999 |
| JP | 2000-207568 | 7/2000 |
| JP | 2003-223639 | 8/2003 |
| JP | 2003-256783 | 9/2003 |
| JP | 2005-293141 | 10/2005 |
| JP | 2005-293579 | 10/2005 |
| JP | 2006-190110 | 7/2006 |
| JP | 2006-350578 | 12/2006 |

OTHER PUBLICATIONS

Chinese Official Action—200880002920.X—Aug. 20, 2012.
Extended European Search Reported—EP 08 71 0567—Dec. 20, 2016.
Ross Bencina et al.: The Design and Evolution of Fiducials for the reacTIVision System, Dec. 31, 2005 (Dec. 31, 2005), XP055324436, Retrieved from the Internet: URL:http://mtg.upf.edu/files/publications/376678-3rditeration2005-mkalten.pdf [retrieved on Nov. 30, 2016] *abstract; figures 3,4 * Section 3*.
C.B. Owen et al: "What i the best fiducial?" Agumented Reality Toolkit the First IEEE International Workshop Sep. 29, 2002, Jan. 1, 2002 (Jan. 1, 2002), p. 8 pp., XP055324194, D01: 10.1109/ART.2002.1107021, ISBN: 978-0-7803-7680-9 *abstract; figure 4* ection I, II.C, and III.A*.
Fiala M: "ARTag, a Fiducial Marker System 1-25 Using Digital Techniques", Proceedings / 2005 IEEE Computer Society Conference on Computer Vision and Pattern Recognition, CVPR 2005: [Jun. 20-25, 2005, San Diego, CA], IEEE, Piscataway, NJ, USA, vol. 2, Jun. 20, 2005 (Jun. 20, 2005), pp. 590-596, XP010817653, DOI: 110.1109/CVPR.2005.74 ISBN: 978-0-7695-2372-9 * figures 2, 4*.

* cited by examiner

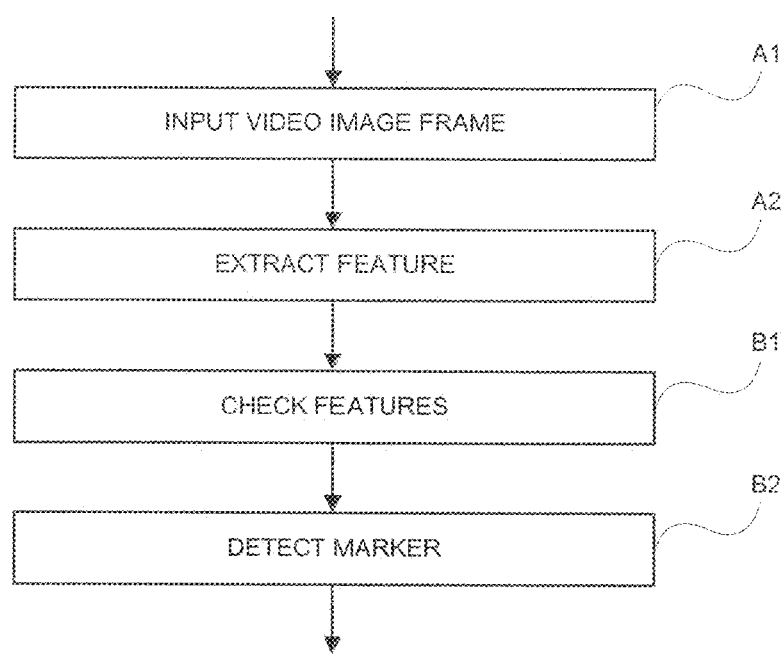

UNIQUE FEATURE

EXAMPLE OF MARKER PATTERN

EXAMPLE OF MARKER PATTERN

EXAMPLE OF MARKER PATTERN

EXAMPLE OF MARKER PATTERN

WHEN MARKER IS NOT PRESENT

INVARIANT FEATURE
GROUPS EXTRACTED
FROM MARKER

WHEN MARKER IS PRESENT

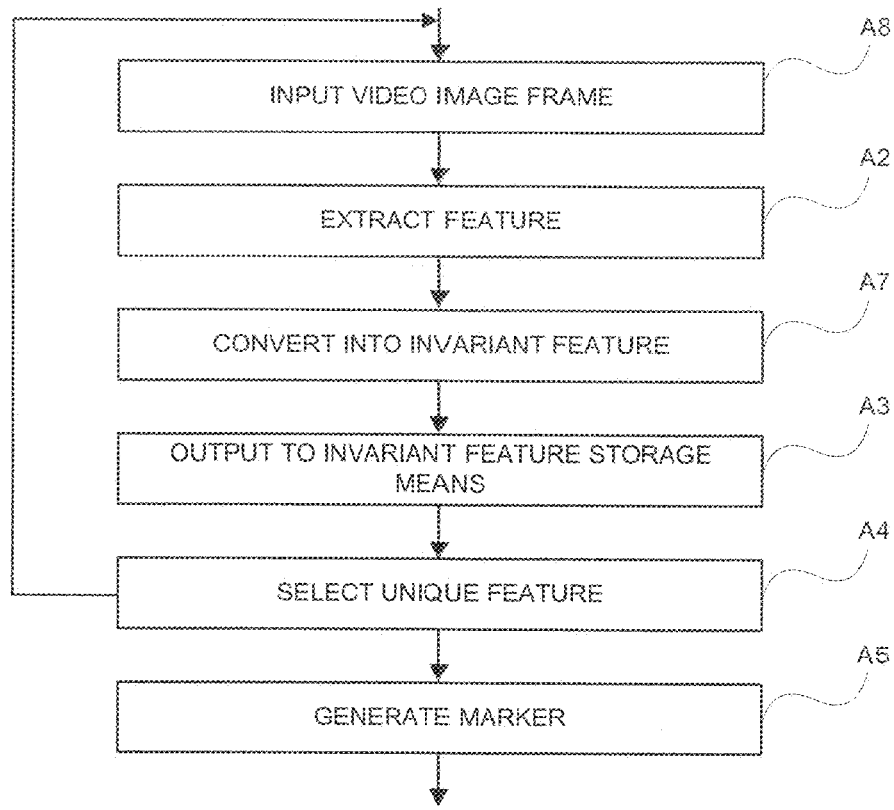
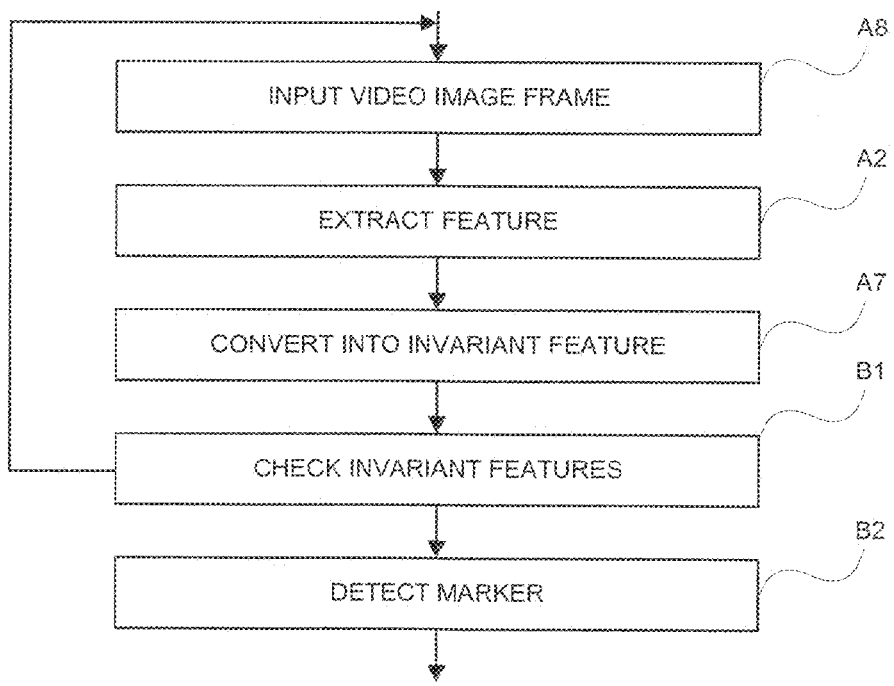

MESH CELL WITH OCCURRENCE FREQUENCY OF NON-ZERO

MESH CELL WITH OCCURRENCE FREQUENCY OF ZERO
⇒ UNIQUE FEATURE

QUANTIZED INVARIANT FEATURE SPACE

UNIQUE FEATURE

EXAMPLE OF MARKER PATTERN

EXAMPLE OF MARKER PATTERN

EXAMPLE OF MARKER PATTERN

EXAMPLE OF MARKER PATTERN

FEATURE POINT GROUP EXTRACTED FROM MARKER PORTION

WHEN MARKER IS NOT PRESENT

WHEN MARKER IS PRESENT

MARKER GENERATING AND MARKER DETECTING SYSTEM, METHOD AND PROGRAM

CROSS REFERENCE TO RELATED APPLICATIONS

This application is a division of application Ser. No. 12/524,027 filed on Jul. 22, 2009, which is a National Stage of PCT/JP2008/050857 filed on Jan. 23, 2008, which claims priority to Japanese Application Nos. 2007-012134 and 2008-003950 filed on Jan. 23, 2007 and Jan. 11, 2008, respectively. The entire contents of each of the above applications are hereby incorporated by reference.

TECHNICAL FIELD

The present invention relates to marker generating and marker detecting system, method and program.

BACKGROUND ART

Examples of conventional video image-based object detection systems are disclosed in Patent Documents 1-7.

The conventional video image-based object detection systems operate as follows:

Specifically, a scheme disclosed in Patent Document 1 enables detection of an object having any shape and estimation of its attitude by sophisticating object detection without attaching a predefined marker elaborately designed beforehand for facilitating or speeding up detection processing. The object detection scheme such as that in Patent Document 1 employing no marker eliminates the need of a marker to be attached, whereas it poses a problem that it is relatively unreliable, has a low detection speed or is unstable. A scheme disclosed in Patent Document 2 solves such a problem by attaching a marker having a distinctive graphic pattern that is relatively visually conspicuous to an object desired to be detected. This document argues that accuracy in detection of any predefined graphic pattern can be improved. However, it poses a problem that once a graphic pattern similar to that of the predefined marker appears in a background by chance, these patterns are confused with each other. Patent Documents 3 and 4 avoid this problem by empirically designing beforehand a marker of a unique shape never anticipated to appear in a background, such as a light-emitting marker and a distinctively colored marker, respectively. A scheme disclosed in Patent Document 5 employs graphic markers of a special shape such as concentric arcs. It also employs means of constructing a graphic marker using an infrared reflector, for example, in combination. These schemes, however, increase cost of the marker, nevertheless still potentially pose a problem similar to that in the method disclosed in Patent Document 2 in a case that a pattern similar to the form of the marker appears in a background by chance or the marker is placed in circumstances, such as outdoors, containing disturbance that may impair uniqueness of the form of the marker. Moreover, the marker must be empirically designed by a method requiring skill to have a form probably unaffected by a background or turbulence, or designed by a trial-and-error process in an actual operating environment. Furthermore, since the marker may be observed with geometric distortion due to the degree of freedom in positioning a camera in imaging, it is necessary to prepare a detection scheme taking account of such distortion. In addition to an increase of computational cost for detection taking account of geometrical distortion, it is likely to increase a possibility that the distorted marker becomes similar to a background pattern by chance. The schemes disclosed in Patent Documents 6 and 7 involve a highly complicated marker of a graphic pattern that never becomes similar to the background pattern by chance. They may embed a redundant code in a marker itself for verifying identification of the marker. Whereas the schemes can significantly reduce the possibility of over-detection of a marker from a background, subtle graphical information on the marker must be visualized on a video image, which may cause misdetection of the marker, so that imaging coverage must be reduced or resolution of an imaging device must be increased, resulting in a presumable increase of cost for implementing a decoder and reduction of the detection speed.

Patent Document 1: JP-P2000-207568A
Patent Document 2: JP-P2003-223639A
Patent Document 3: JP-P2003-256783A
Patent Document 4: JP-P2005-293141A
Patent Document 5: JP-P2005-293579A
Patent Document 6: JP-P2006-190110A
Patent Document 7: JP-P1995-254037A

DISCLOSURE OF THE INVENTION

Problems to be Solved by the Invention

A first problem is low reliability in object detection of the conventional schemes. The reason thereof is that the conventional schemes tend to over-detection when a pattern similar to a marker appears in a background, or otherwise suffer from misdetection due to failure in reading of a marker's fine structure when complicating the marker to avoid over-detection.

A second problem is that a trial-and-error process or a skilled person is required in designing a marker. The reason thereof is that a marker is empirically designed beforehand, which causes over-detection in a case that a similar pattern is present in a practical operating environment.

A third problem is an increase of cost required in disposing a marker. The reason thereof is that a reflector, a light-emitting element or the like is employed to facilitate visual discrimination for preventing the marker from becoming similar to a background pattern.

A fourth problem is that when the positional relationship between a marker and an imaging device is unrestricted, more significant reduction of accuracy and speed in detection may result. The reason thereof is that since design of a marker per se is based on experience and skill without taking account of geometrical distortion, a detection algorithm taking account of distortion is required, and geometrical distortion causes an increase of the frequency that the marker matches a background pattern by chance.

A fifth problem is that an imaging device with higher resolution and a decoder for a more complex marker are required to reduce over-detection. The reason thereof is that the marker must be complicated.

The present invention has thus been made in view of such problems, and its object is to provide a system, method and program for marker generation and marker detection for solving the aforementioned problems.

Another object of the present invention is to provide a system, method and program for marker generation and marker detection enabling automatic design of a graphic marker so that it is dissimilar to any pattern appearing in a background video image.

Still another object of the present invention is to provide a system, method and program for marker generation and marker detection enabling detection with high accuracy and high speed for generation and detection of a marker taking account of geometrical distortion.

Yet another object of the present invention is to provide a system, method and program for marker generation and marker detection that can be made robust against reduction in resolution of an imaging device because the marker pattern is not complicated more than necessary.

Means for Solving the Problems

The present invention for solving the aforementioned problems is a marker generating system comprising: feature extracting means for extracting as a feature a segment containing a distinctive pattern in a video image not containing a marker; unique feature selecting means for selecting as a unique feature an image feature not appearing in said video image based on said extracted feature; and marker generating means for generating a marker based on said unique feature.

The present invention for solving the aforementioned problems is a marker detecting system for extracting as a feature a segment containing a distinctive pattern in a video image not containing a marker, selecting as a unique feature an image feature not appearing in said video image based on said extracted feature, and detecting a marker generated based on said unique feature, said system comprising: storage means for storing a feature of said marker; and feature checking means for checking a feature in the video image subjected to detection with the feature of said marker and notifying detection of a marker when a match of the features is found.

The present invention for solving the aforementioned problems is a marker detecting system for extracting as a feature a segment containing a distinctive pattern in a video image not containing a marker; and detecting a marker generated based on a unique feature selected from a portion that is not an invariant feature generated from said feature, said system comprising: storage means for storing an invariant feature of said marker; and invariant feature checking means for checking an invariant feature in the video image subjected to detection with that of said marker, and notifying detection of a marker when a match of the invariant features is found.

The present invention for solving the aforementioned problems is a marker generating method comprising: extracting as a feature a segment containing a distinctive pattern in a video image not containing a marker; selecting as a unique feature an image feature not appearing in said video image based on said extracted feature; and generating a marker based on said unique feature.

The present invention for solving the aforementioned problems is a marker detecting method for extracting as a feature a segment containing a distinctive pattern in a video image not containing a marker, selecting as a unique feature an image feature not appearing in said video image based on said extracted feature, and detecting a marker generated based on said unique feature, said method comprising: checking a feature in the video image subjected to detection with a feature of said marker stored beforehand; and notifying detection of a marker when a match of the features is found.

The present invention for solving the aforementioned problems is a marker detecting method for extracting as a feature a segment containing a distinctive pattern in a video image not containing a marker, and detecting a marker generated based on a unique feature selected from a portion that is not an invariant feature generated from said feature, said method comprising: checking an invariant feature in the video image subjected to detection with an invariant feature of said marker stored beforehand; and notifying detection of a marker when a match of the invariant features is found.

The present invention for solving the aforementioned problems is a program causing an information processing apparatus to execute the processing of: extracting as a feature a segment containing a distinctive pattern in a video image not containing a marker; selecting as a unique feature an image feature not appearing in said video image based on said extracted feature; and generating a marker based on said unique feature.

The present invention for solving the aforementioned problems is a program for marker detection, for extracting as a feature a segment containing a distinctive pattern in a video image not containing a marker, selecting as a unique feature an image feature not appearing in said video image based on said extracted feature, detecting a marker generated based on said unique feature, said program causing an information processing apparatus to execute the processing of: checking a feature in the video image subjected to detection with a feature of said marker stored beforehand; and notifying detection of a marker when a match of the features is found.

The present invention for solving the aforementioned problems is a program for marker detection, for extracting as a feature a segment containing a distinctive pattern in a video image not containing a marker, and detecting a marker generated based on a unique feature selected from a portion that is not an invariant feature generated from said feature, said program causing an information processing apparatus to execute the processing of: checking an invariant feature in the video image subjected to detection with an invariant feature of said marker stored beforehand; and notifying detection of a marker when a match of the invariant features is found.

The present invention for solving the aforementioned problems is a marker serving as a target of detection, which has a pattern that matches none of patterns in a background video image not containing a marker.

The present invention for solving the aforementioned problems is a marker serving as a target of detection, which is generated by: extracting as a feature a segment containing a distinctive pattern in a video image not containing a marker; selecting as a unique feature an image feature not appearing in said video image based on said extracted feature; and generating said marker based on said unique feature.

The present invention for solving the aforementioned problems is a marker serving as a target of detection, which is generated by: extracting as a feature a segment containing a distinctive pattern in a background video image not containing a marker; acquiring an invariant feature from said feature; selecting as a unique feature a portion that is not said invariant feature; and generating said marker based on said selected unique feature.

Effects of the Invention

A first effect is that reliability of object detection can be improved. The reason thereof is that a marker is designed by observing a background and avoiding similar patterns. Since the marker needs not be complicated more than necessary, an imaging device with comparatively low resolution may be used without failure in reading of a marker's fine structure, and misdetection is prevented.

A second effect is that there is no need for a trial-and-error process or a skilled person in designing a marker. The reason thereof is that a background is observed and a marker is automatically designed based on the observation.

A third effect is that cost for disposing a marker can be reduced. The reason thereof is that since a marker can be automatically generated as a distinctive graphic pattern unlikely to be confused with a background, visual discriminability can be achieved without relying on a marker material such as a reflector or a light-emitting element.

A fourth effect is that even when the positional relationship between a marker and an imaging device is unrestricted, no reduction of accuracy or speed in detection is experienced. The reason thereof is that since a marker is designed by performing observation through a geometrical invariant unaffected by geometrical distortion due to a positional relationship relative to an object, and designing the marker so that the geometrical invariant is dissimilar to a background pattern, there is no possibility that the marker matches the background pattern by chance due to geometrical distortion, and in addition, marker detection can be achieved without any special consideration in detecting a marker depending upon variation in positional relationship with respect to an object by, for example, correcting geometrical distortion or making a match taking account of distortion.

A fifth problem is that inexpensive implementation is possible without the need for an imaging device with high resolution or a decoder for a more complicated marker. The reason thereof is that since the least required graphical discrimination between a marker and a background pattern may be sufficient, the need for complicating a marker more than necessary is eliminated and it is not always necessary to embed a redundant code into a marker.

BRIEF DESCRIPTION OF THE DRAWINGS

FIG. 3 A flow chart showing an operation of the second embodiment.
FIG. 4 A schematic diagram for explaining the present invention.
FIG. 27 A flow chart showing an operation of the fifth embodiment.
FIG. 28 A flow chart showing an operation of the sixth embodiment.

EXPLANATION OF SYMBOLS

Figure 1:
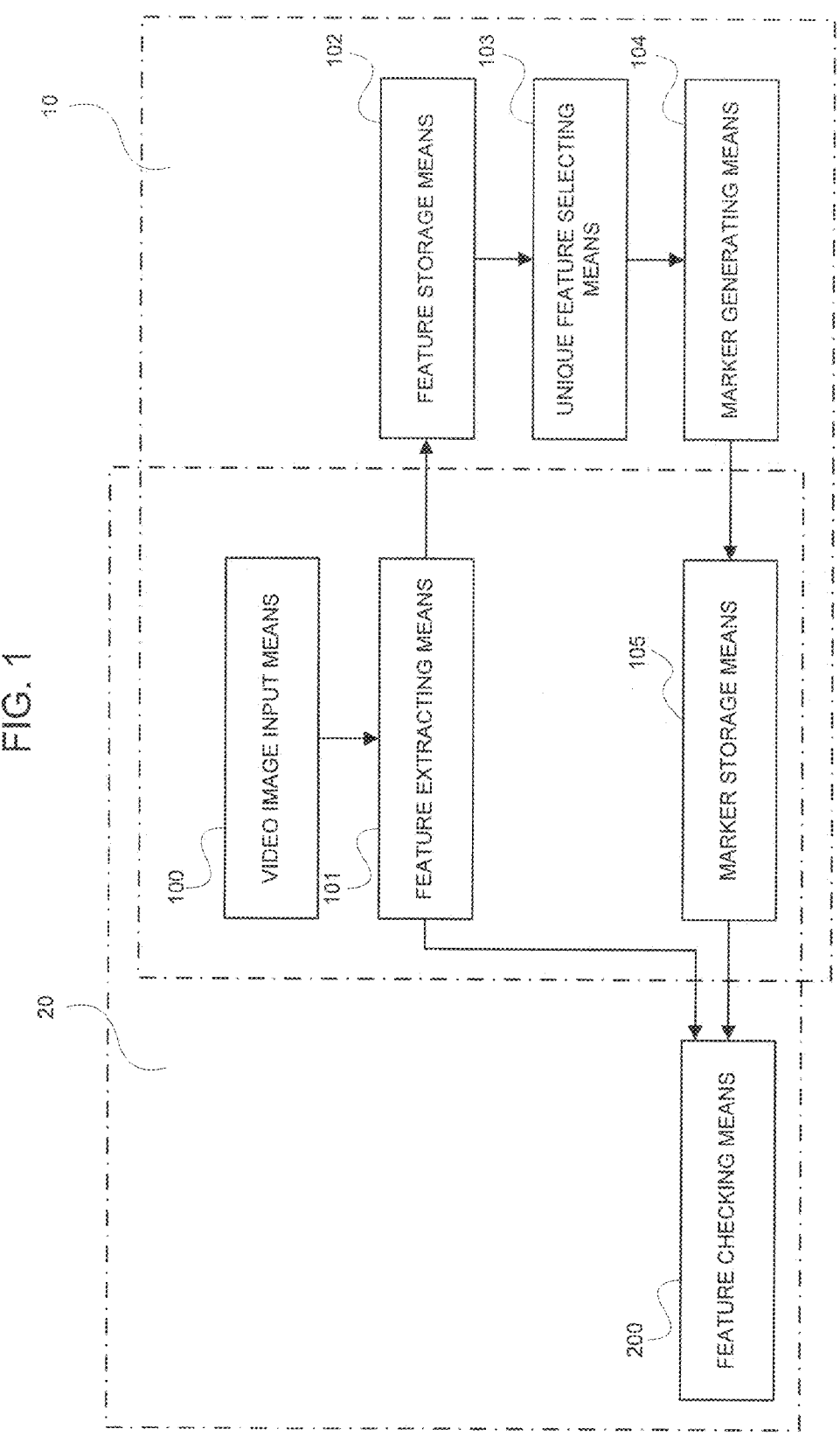
FIG. 1 A block diagram showing a configuration of first and second embodiments.

10, 11 Graphic marker generating section
20, 21 Graphic marker detecting section
100 Video image input means
101 Feature extracting means 102 Feature storage means
103 Unique feature selecting means
104 Marker generating means
105 Marker storage means
106 Invariant feature converting means
200 Feature checking means

BEST MODES FOR CARRYING OUT THE INVENTION

Embodiments of the present invention will be explained.

A embodiment of the present invention is a marker generating system comprising: feature extracting means for extracting as a feature a segment containing a distinctive pattern in a video image not containing a marker; unique feature selecting means for selecting as a unique feature an image feature not appearing in the video image based on the extracted feature; and marker generating means for generating a marker based on the unique feature.

The embodiment of the present invention further comprises feature storage means for calculating and storing a frequency distribution of the extracted features, wherein the unique feature selecting means selects as a unique feature a portion having a frequency equal to or smaller than a predefined value from the frequency distribution of the features.

Also, the embodiment of the present invention further comprises invariant feature converting means for generating an invariant feature from the extracted feature, wherein the unique feature selecting means selects a portion that is not the invariant feature as a unique feature.

Also, in the embodiment, the invariant feature converting means generates a geometrical invariant feature from the feature.

Also, in the embodiment, the invariant feature converting means generates an object-color invariant feature from the feature.

Also, in the embodiment, the invariant feature converting means generates a texture invariant feature from the feature.

Also, in the embodiment, the invariant feature converting means receives a multi-dimensional feature as an input and generates a multi-dimensional invariant feature.

Also, in the embodiment, the invariant feature converting means generates an invariant feature from a combination of any one or more of a geometrical invariant feature, an object-color invariant feature, a texture invariant feature, and a multi-dimensional invariant feature thereof.

Also, in the embodiment, the unique feature selecting means is configured to increase/decrease the number of unique features to be selected.

Also, in the embodiment, the unique feature selecting means calculates a frequency distribution of the invariant features, and selects as a unique feature a portion having a frequency equal to or smaller than a predefined threshold from the calculated frequency distribution of the invariant features.

Also, in the embodiment, the unique feature selecting means controls the number of unique features to be selected by modifying the threshold.

Also, the embodiment of the present invention further comprises video image input means for inputting the video image.

Also, in the embodiment, the video image input means is capable of panning, tilting, zooming or moving.

Also, the embodiment of the present invention further comprises video image input control means for providing start and end times at which a video image is input to the video image input means, and a time at which imaging is performed.

Also, in the embodiment, in response to a signal from the video image input control means, the video image input means performs imaging, whereupon a marker is generated.

Also, in the embodiment, in response to a signal from the video image input control means, the video image input means performs imaging, whereupon the invariant feature converting means accumulates the invariant feature accordingly.

Also, a embodiment of the present invention is a marker detecting system for extracting as a feature a segment containing a distinctive pattern in a video image not containing a marker, selecting as a unique feature an image feature not appearing in the video image based on the extracted feature, and detecting a marker generated based on the unique feature, comprising: storage means for storing a feature of the marker; and feature checking means for checking a feature in the video image subjected to detection with that of the marker, and notifying detection of a marker when a match of the features is found.

Also, the embodiment of the present invention further comprises: video image input means for inputting a video image subjected to detection; and video image input control means for providing start and end times at which a video image is input to the video image input means, and a time at which imaging is performed, wherein the feature checking means checks a feature with a marker as the video image is input, and generates a notification when checking is succeeded at a frequency equal to or greater than a predefined number of times.

Also, a embodiment of the present invention is a marker detecting system for extracting as a feature a segment containing a distinctive pattern in a video image not containing a marker, and detecting a marker generated based on a unique feature selected from a portion that is not an invariant feature generated from the feature, comprising: storage means for storing an invariant feature of the marker; and invariant feature checking means for checking an invariant feature in the video image subjected to detection with that of the marker, and notifying detection of a marker when a match of the invariant features is found.

Also, in the embodiment, the invariant feature is any one of a geometrical invariant feature, an object-color invariant feature, a texture invariant feature, and a multi-dimensional invariant feature thereof, or a combination of the foregoing.

Also, in the embodiment, the invariant feature checking means notifies detection of a marker when one invariant feature matches.

Also, in the embodiment, the invariant feature checking means excludes from objects to be checked an invariant feature of the marker corresponding to that of the video image that may cause over-detection.

Also, in the embodiment, the invariant feature checking means identifies a background portion corresponding to an invariant feature that may cause over-detection.

Also, the embodiment of the present invention further comprises means for confining an area in a video image subjected to detection.

Also, the embodiment of the present invention further comprises: video image input means for inputting a video image subjected to detection; and video image input control means for providing start and end times at which a video image is input to the video image input means, and a time at which imaging is performed, wherein the invariant feature checking means checks an invariant feature in the video image with that of a marker as the video image is input, and generates a notification when checking is succeeded at a frequency equal to or greater than a predefined number of times.

Now embodiments of the present invention will be explained in detail with reference to the accompanying drawings.

Referring to FIG. 1, the present invention is broadly divided into a graphic marker generating section 10 and a graphic marker detecting section 20.

<First Embodiment>

A first embodiment relates to the graphic marker generating section 10. The graphic marker generating section 10 is comprised of video image input means 100, feature extracting means 101, feature storage means 102, unique feature selecting means 103, and marker generating means 104.

The graphic marker generating section 10 is for, before actually attaching a marker to an object and performing marker detection, in an environment in which marker detection is applied, observing a background pattern, that is, a scene excluding the object to be detected, obtaining an occurrence frequency distribution of features, and based on the distribution, outputting a graphic pattern as a marker pattern that is never present in the background pattern.

The means constituting the graphic marker generating section 10 generally operate in a manner as described below.

The video image input means 100 inputs a video image containing an image of an environment to which the present invention is applied, such as a live video image from an imaging device, a recorded video image, and a distributed video image.

The feature extracting means 101 receives a video image not containing a marker from the video image input means 100 as an input, and extracts image features including distinctive patterns in the video image frame.

The feature storage means 102 keeps a memory area for calculating a frequency distribution of a feature output by the feature extracting means 101, and stores it.

The unique feature selecting means 103 selects as a unique feature a portion having a frequency of zero or smaller than a predefined value, for example, from the generated frequency distribution of the features.

The marker generating means 104 receives the unique feature as an input, and generates a marker pattern by combining it with an image pattern that can be easily detected by the feature extracting means 101, and outputs it.

The marker storage means 105 stores therein the marker pattern output by the marker generating means 104.

Next, an overall operation of the present embodiment will be explained in detail with reference to FIG. 1 and the flow chart shown in FIG. 2.

Figure 2:
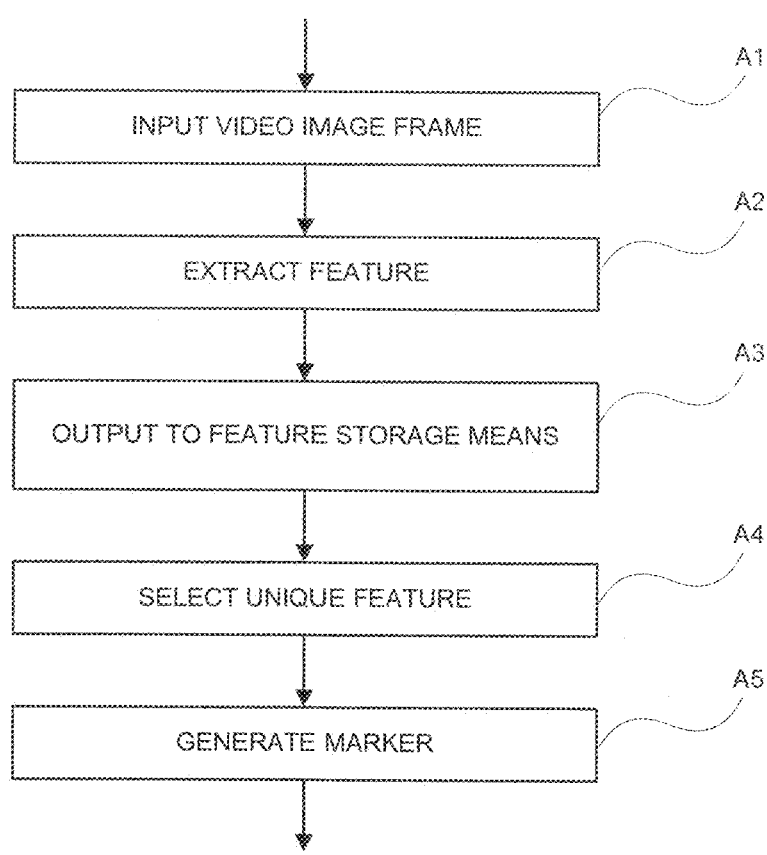
FIG. 2 A flow chart showing an operation of the first embodiment.

First, a still-image frame that captures an environment not containing a marker, i.e., a background image, is input as a digitized frame image (Step A1 in FIG. 2).

Figure 6:
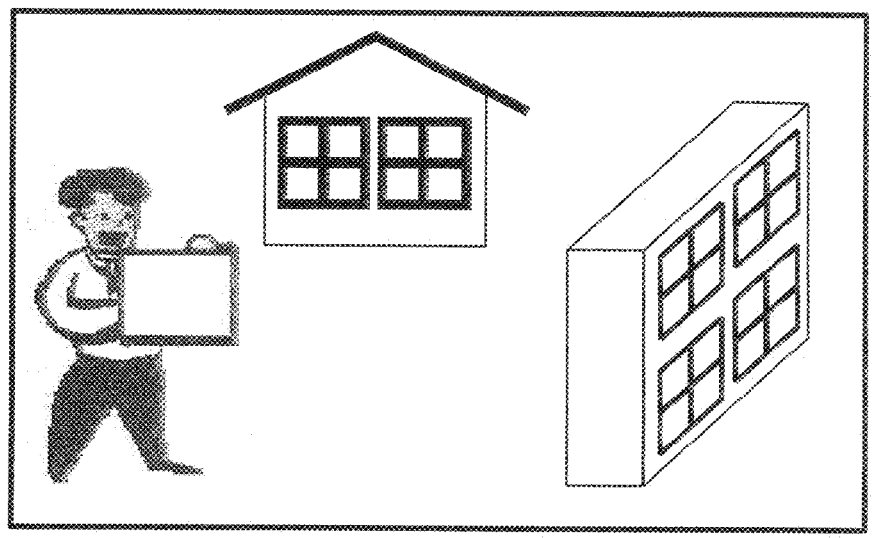
FIG. 6 A schematic diagram for explaining the present invention.
Figure 7:
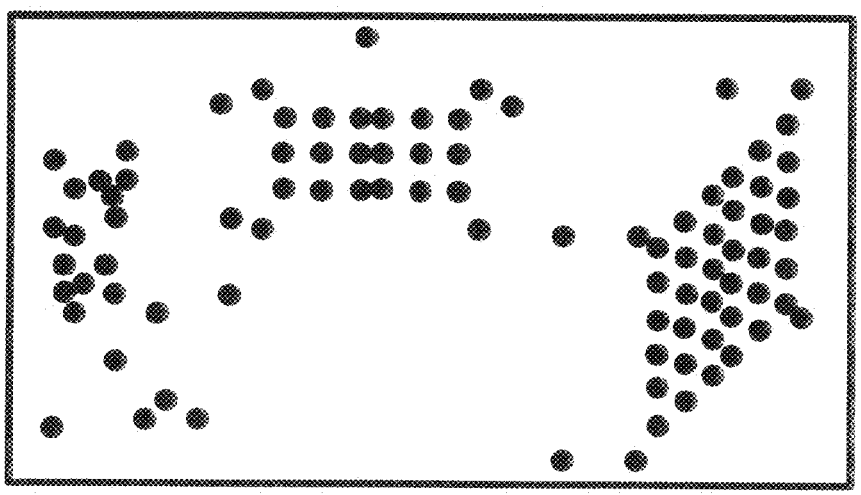
FIG. 7 A schematic diagram showing an operation of an example.

Next, an image feature is extracted from the input still-image frame (Step A2). For the image feature, a graphically distinctive property in the form of numeric values may be used, for example. For example, a method disclosed by T. Tommasini, et al. in "Making good features track better," Proceedings of IEEE International Conference on Computer Vision and Pattern Recognition (1998), may be used to extract vertices of a shape of an object, intersections of linear objects, endpoints, etc. (indicated by ○ in FIG. 5) in an image (see FIG. 4), although a series of position coordinate information of these points on the image may be defined as graphical features. When applying feature extraction according to the method to a background scene as shown in FIG. 6, feature point groups as indicated by ○ in FIG. 7 are obtained, and coordinate values of these point groups can be employed as features thereafter. According to a method disclosed by U. Montanari in "On the optimal detection of curves in noisy pictures," Communications of ACM, Vol. 14 (1971), entries in an R table in which a distance from a reference point and a relative angle are stored may be employed as features. At that time, by defining a reference point for all feature positions and exhaustively extracting features, marker detection may be made robust against partial loss of features (described later). Other examples of feature extraction may include one using features represented by luma or chroma values themselves of pixels on an image.

All the features thus generated are output to and stored in the feature storage means (Step A3).

Upon completion of recording of a series of features, an image feature not appearing in the scene is selected from the stored feature groups as a unique feature (Step A4). The unique feature may be selected as a feature that does not match any background pattern, that is, a segment of the feature space in which none of the feature groups in the background appears. To avoid an unexpected event in which the unique feature becomes similar to the background pattern afterwards due to an error in extraction of feature points or the like, a unique feature may be selected from a larger area of the feature space in which none of the features of the background patterns is present. To implement this, since the implementation may be regarded as equivalent to a problem of finding a large blank space from a distribution of points in space, an algorithm, such as for example, "An Algorithm for Finding Maximal WHITESPACE Rectangles at Arbitrary Orientations for Document Layout Analysis," Proceedings of International Conference on Document Analysis and Recognition (2003), may be used to extract a large blank space, or a center of the resulting rectangular region that contains no feature point may be defined as a unique feature. Another method involves quantizing the feature space in a mesh having a particular cell size, generating a one-dimensional or multi-dimensional histogram, and defining the centers of mesh cells with a frequency of zero as a unique feature. If no mesh cell with a frequency of zero is found, the size of the mesh cell may be reduced to regenerate a histogram, and a unique feature may be selected from mesh cells with a frequency of zero if present. When no mesh cell with a frequency of zero is found, threshold processing may be applied to the histogram by using a predefined value to select a unique feature from mesh cells having a value less than or equal to the predefined value.

Finally, from the unique feature extracted as described above, a marker pattern is generated (Step A5). First, a case in which vertices, intersections and endpoints in an image are employed as feature points as in the aforementioned example will be illustrated. When the aforementioned method disclosed in "On the optimal detection of curves in noisy pictures" is employed, detection of feature point groups required in detection of a marker pattern depends upon a feature point detection algorithm used in feature extraction at A2. For example, methods of generating a marker pattern are exemplified as described below:

(1) a pattern having intersections positioned at the position of the unique feature;

(2) a pattern generated by repeating an operation of finding a convex hull of a unique feature and filling its inside with a specific color, and finding another convex hull again using a unique feature that is not used in the first convex hull and filling its inside with another color, until all features are selected;

(3) a pattern formed of a set of filled-in rectangles having vertices lying at the position of the unique feature and having horizontal and vertical sides; and (4) a pattern in which nearest neighbor ones of unique feature points are connected by line segments.

Moreover, when luma and chroma values are employed as a feature obtained at A2, a marker may be printed using a paint corresponding to the luma and chroma values corresponding to the unique feature.

Furthermore, it is possible to combine the aforementioned method using vertices, intersections and endpoints as graphical features with other feature information. In such a case, a marker having the brightness, color, shape corresponding to the selected unique feature may be generated.

Next, effects of the present embodiment will be explained.

Since the present embodiment is configured to observe a background scene and enable automatic design of a marker pattern so that it is dissimilar to the background pattern, reliability in object detection can be improved. For a similar reason, there is no need for a trial-and-error process or a skilled person in designing a marker. Since the marker needs not be complicated more than necessary, an imaging device with comparatively low resolution may be used without failure in reading of a marker's fine structure, and misdetection is prevented.

Moreover, since the present embodiment is configured to automatically generate a marker as a distinctive pattern unlikely to be confused with a background, cost for disposing a marker can be reduced.

Finally, the present embodiment is configured so that the need for complicating a marker more than necessary is eliminated and it is not always necessary to embed a redundant code into a marker because the least required discrimination between a marker and a background pattern may be sufficient, and therefore, inexpensive implementation is possible without the need for an imaging device with high resolution or a decoder for a complicated marker.

<Second Embodiment>

Next, a second one of the best modes for carrying out the present invention will be explained in detail with reference to the accompanying drawings.

The graphic marker detecting section 20 of the present invention will now be explained in detail with reference to FIG. 1. The present invention relates to detection of a marker pattern from a scene.

The second embodiment relates to the graphic marker detecting section 20. The graphic marker detecting section 20 is comprised of video image input means 100, feature extracting means 101, marker storage means 105, and feature checking means 200.

These means generally operate in a manner as described below.

The video image input means 100 and feature extracting means 101 operate similarly to those in the first embodiment.

The marker storage means 106 stores therein marker patterns generated beforehand. When a marker pattern generated by the graphic marker generating section 10 in the first embodiment is used, the marker pattern generated by the marker generating means 104 is input and stored.

The feature checking means 200 checks with a marker pattern stored in the marker storage means 104, and notifies detection of a marker when a match is found.

Next, an overall operation of the present embodiment will be explained in detail with reference to FIG. 1 and the flow chart shown in FIG. 3.

First, Steps A1 and A2 in FIG. 3 operate on a video image scene from which a marker is to be detected similarly to those in the first embodiment.

Feature groups generated from the video image scene are checked with a marker pattern stored beforehand in the marker storage means 105 (Step B1). The marker pattern is converted into a feature beforehand. For example, in a case that one of features of the marker pattern and one of features generated from the video image scene have an Euclidean distance equal to or smaller than a predefined value in the feature space, the features may be regarded as a match and the accumulated number of matched invariant features may be defined as a score.

Moreover, when the result of checking with the marker pattern satisfies a predefined condition, a notification that the marker pattern is found from the video image scene is generated (Step B2).

When employing the aforementioned example, marker detection may be acknowledged in a case that the score exceeds a predefined value, or a condition that an accumulated value of the aforementioned Euclidean distance is equal to or smaller than a predefined value may be additionally incorporated. As described above in the first embodiment, when determination of a unique feature is performed in a quantized feature space, the unique feature may be stored, and in a case that a feature from the video image scene is projected even once onto a mesh cell having a frequency of zero in designing a marker, it may be regarded as contribution from the marker pattern to confirm detection, whereby marker detection can be quickly achieved. To avoid misassociation due to noise or an error in feature extraction calculation, the frequency of projection to be acknowledged may be defined as a predefined value of one or more. Alternatively, when a similar quantized feature space can be generated from a marker pattern, it may be employed. In this case, marker pattern detection may be acknowledged when an invariant feature obtained from the video image scene matches with a feature space mesh to which the marker pattern is projected once or a predefined number of times.

Next, effects of the best modes for carrying out the present invention will be explained.

Since the best modes for carrying out the present invention are configured to check the marker pattern with a video image scene through an invariant, quickness and reliability in object detection can be improved. Moreover, by simplifying a method of deciding acknowledgement or rejection of a marker pattern, it is possible to further improve the speed of detection processing while maintaining reliability in object detection.

Example 1

Next, a specific example will be explained.

First, an operation of marker design will be particularly explained with reference to a case in which a graphical feature is employed.

Figure 8:
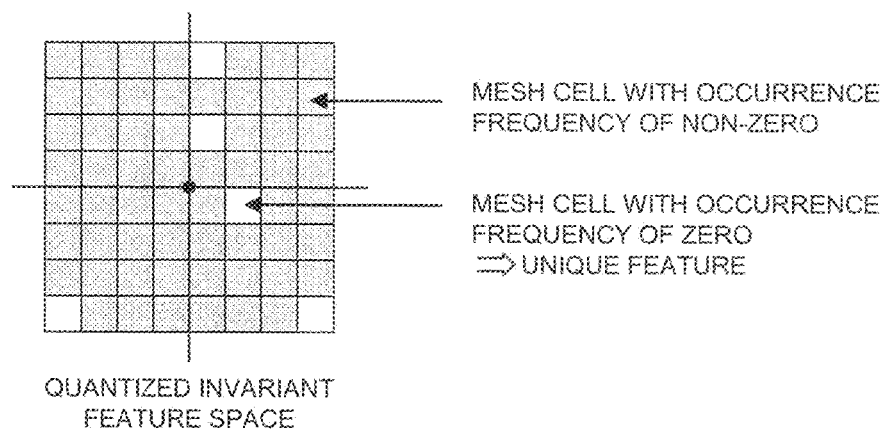
FIG. 8 A schematic diagram showing an operation of the example.

For a video image scene as shown in FIG. 6, feature point groups as indicated by ● shown in FIG. 7 are generated. An exemplary operation of selecting a unique feature from a quantized feature space will be explained hereinbelow. FIG. 8 shows a mesh having 8×8 cells obtained by mapping feature point groups onto a feature space and quantizing the invariant space from the result. In FIG. 8, a filled-in mesh cell indicates an occurrence frequency of non-zero, that is, indicates that a projection of a feature point is present within the mesh cell, and a non-filled mesh cell indicates a mesh cell having an occurrence frequency of zero.

Figure 9:
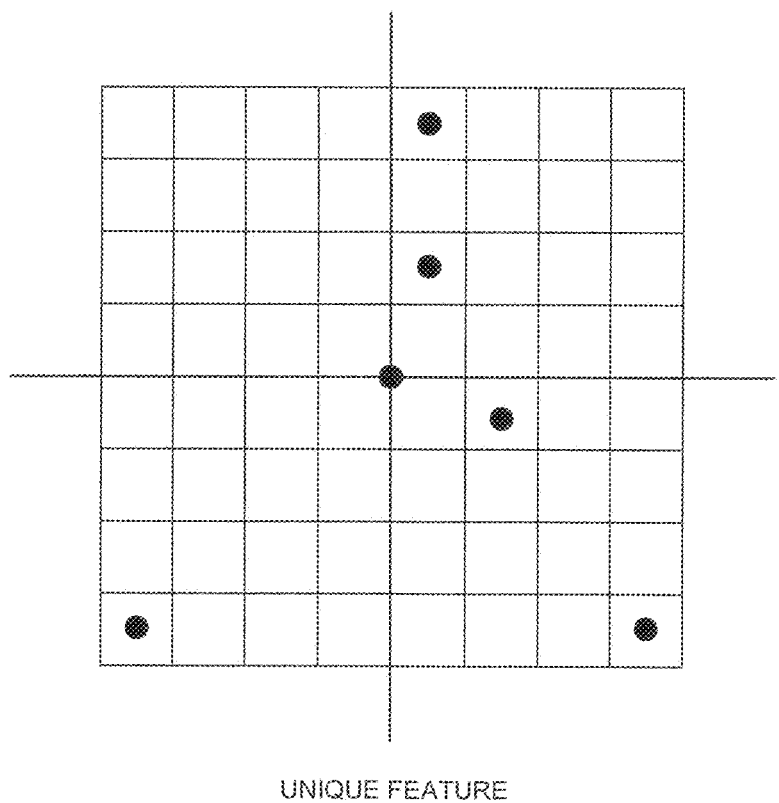
FIG. 9 A schematic diagram showing an operation of the example.
Figure 10:
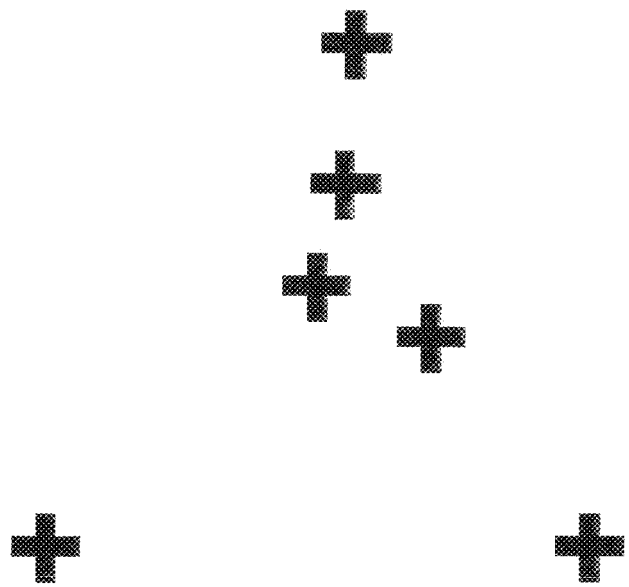
FIG. 10 A schematic diagram showing an operation of the example.
Figure 11:
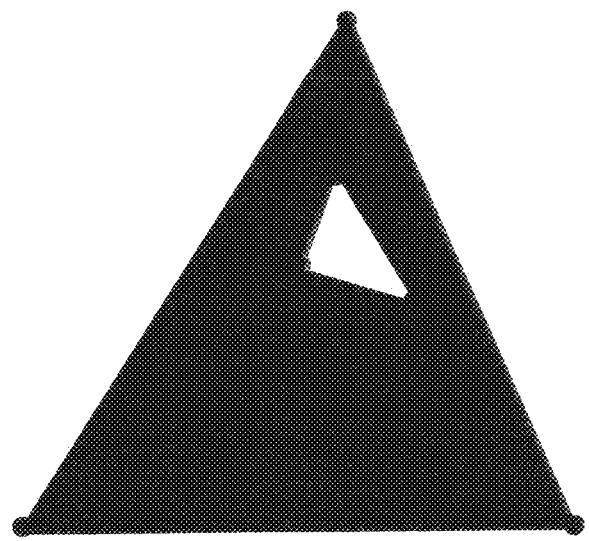
FIG. 11 A schematic diagram showing an operation of the example.
Figure 12:
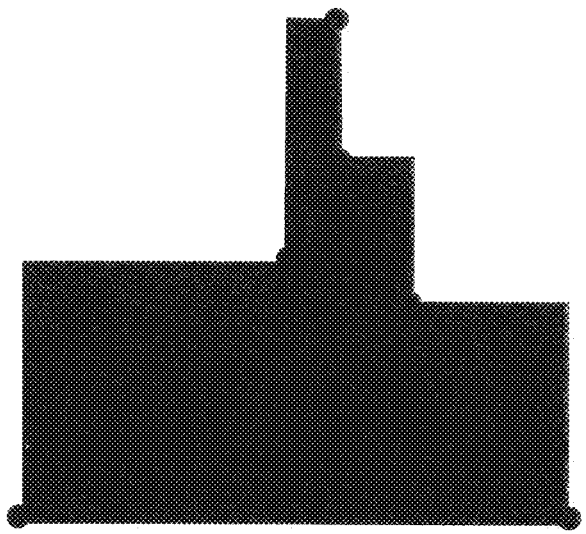
FIG. 12 A schematic diagram showing an operation of the example.
Figure 13:
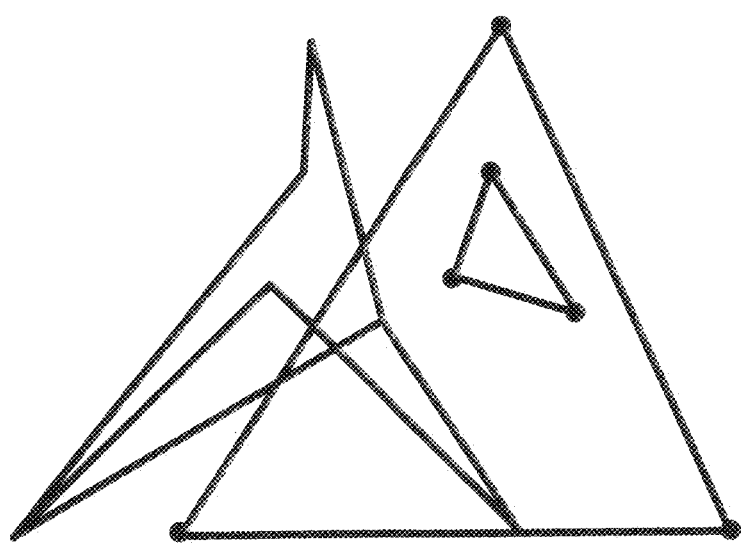
FIG. 13 A schematic diagram showing an operation of the example.

According to the first embodiment, a unique feature is selected from the non-filled mesh cells. An example in which a center of a non-filled mesh cell is defined as a unique feature is shown in FIG. 9. In this example, a reference point, that is, an origin (0, 0), of a feature space is included in the unique feature. However, the origin may be excluded from the unique feature. Exemplary marker patterns are then generated from the resulting unique feature point groups according to the four generation methods explained in the first embodiment, which are shown in FIGS. 10-13.

Figure 14:
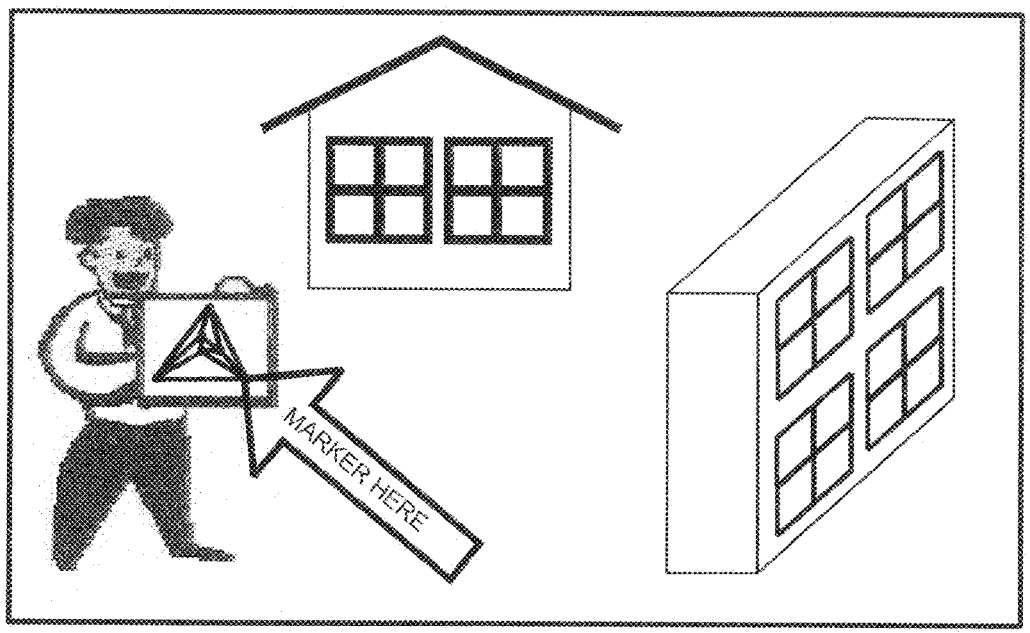
FIG. 14 A schematic diagram showing an operation of the example.
Figure 15:
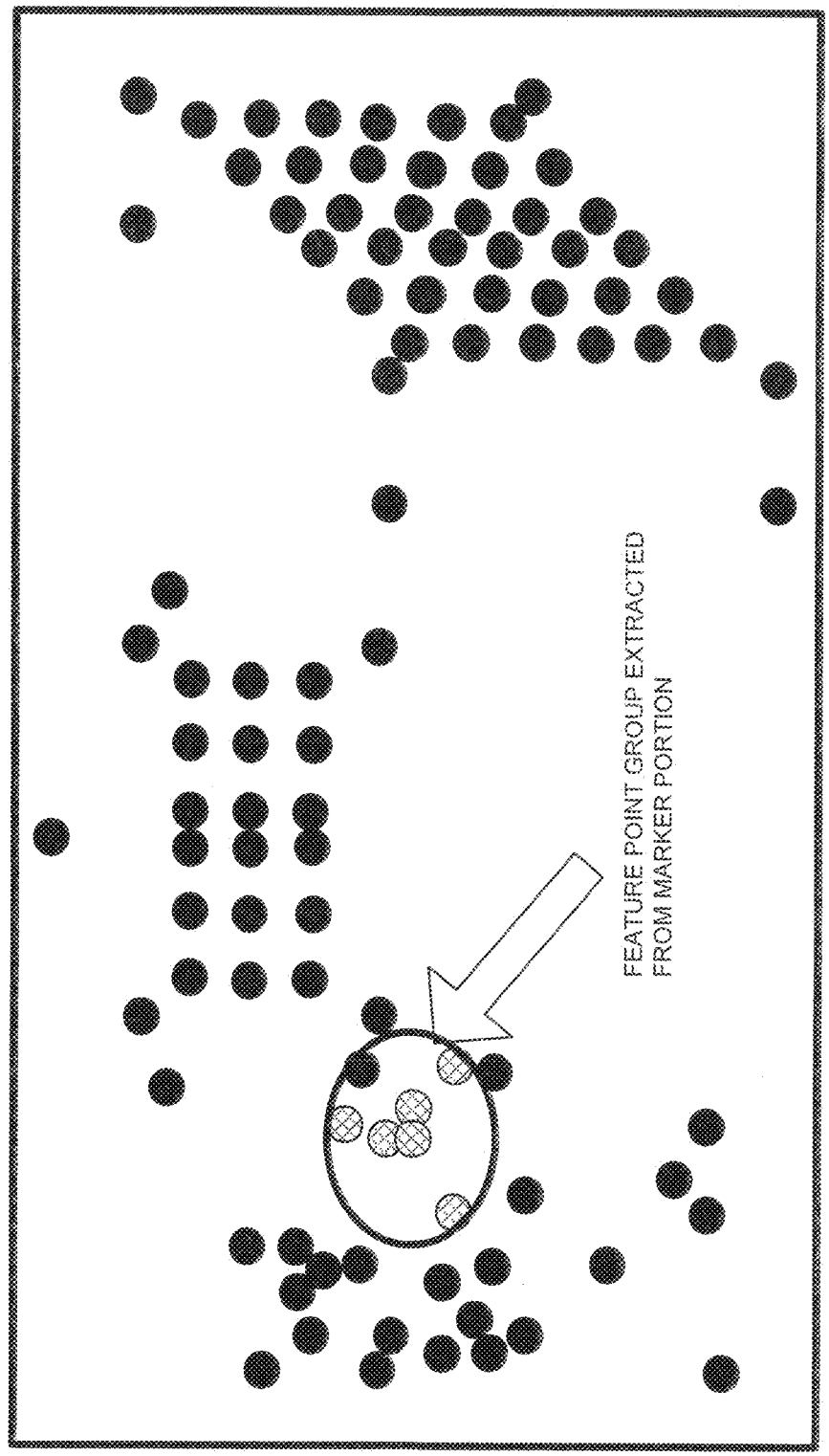
FIG. 15 A schematic diagram showing an operation of the example.
Figure 16:
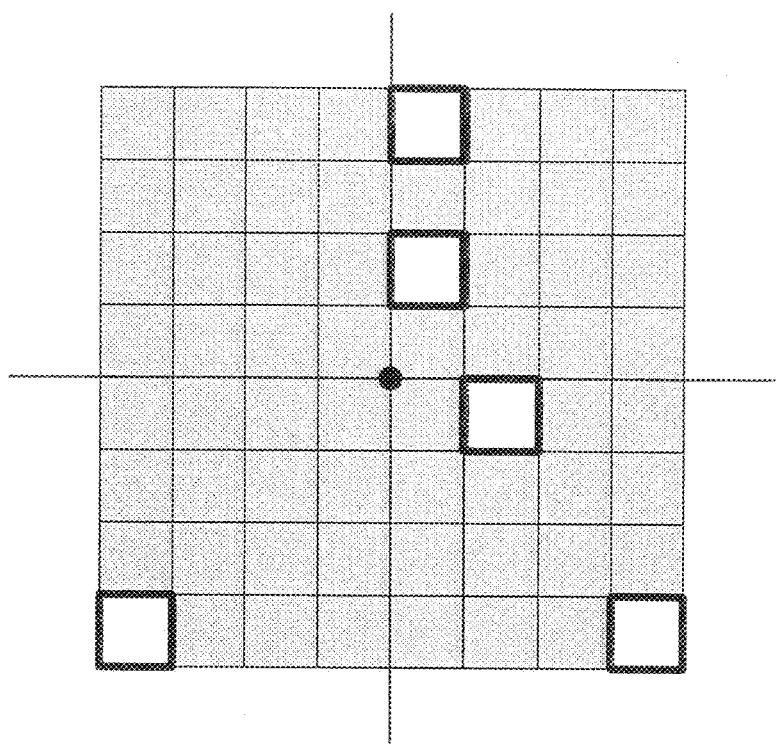
FIG. 16 A schematic diagram showing an operation of the example.
Figure 17:
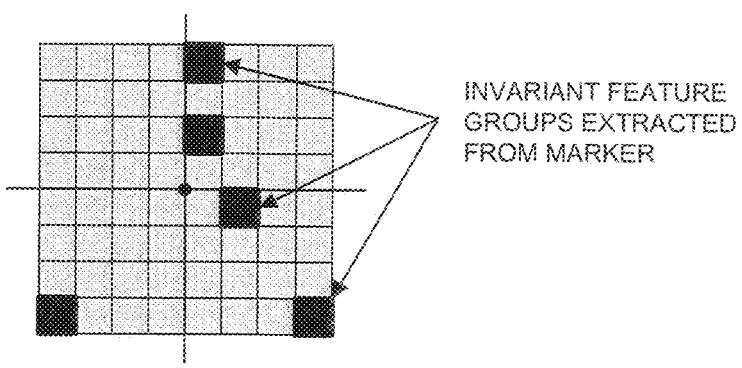
FIG. 17 A schematic diagram showing an operation of the example.

Next, an operation of marker detection will be particularly explained. The following description will be made on a procedure for quickly and stably detecting the marker shown in FIG. 13 from a video image scene including the marker as shown in FIG. 14. A result of feature extraction on this scene is shown in FIG. 15. Moreover, the result is mapped onto an invariant feature space and quantized to obtain a mesh having cells onto which feature points are mapped, the result of which is shown in color in FIG. 17. In a case that the marker is not present, a map of the feature points is as shown in FIG. 16. Thus, in a case that feature points are present in mesh cells (bold-line boxes in FIG. 17) in which no map should be present from the background, a decision that the marker is present may be made.

Figure 18:
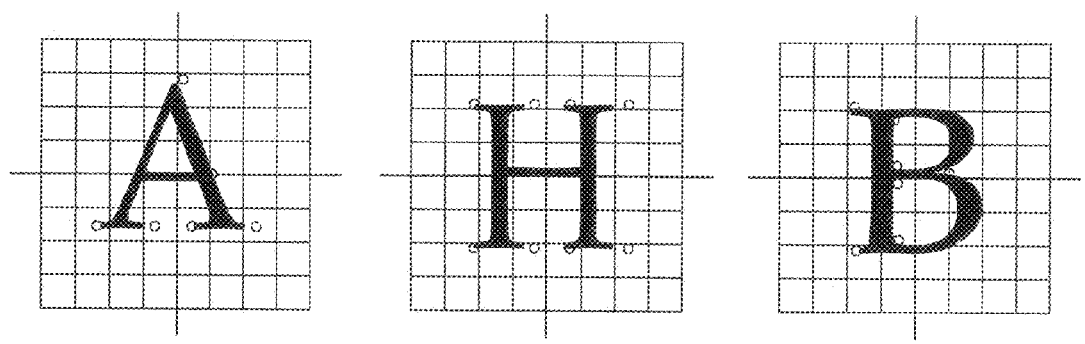
FIG. 18 A schematic diagram showing an operation of the example.

When a plurality of kinds of markers are used, ○ or purple mesh cells in FIG. 18 may be stored corresponding to each marker pattern (the light-colored letters "A," "H" and "B" are examples of markers), and a marker for which most similar maps, that is, a largest number of maps, are obtained near or at the mesh cells in detection may be employed as a result of detection.

<Third Embodiment>

Next, a third embodiment of the present invention will be explained in detail with reference to the accompanying drawings.

Figure 19:
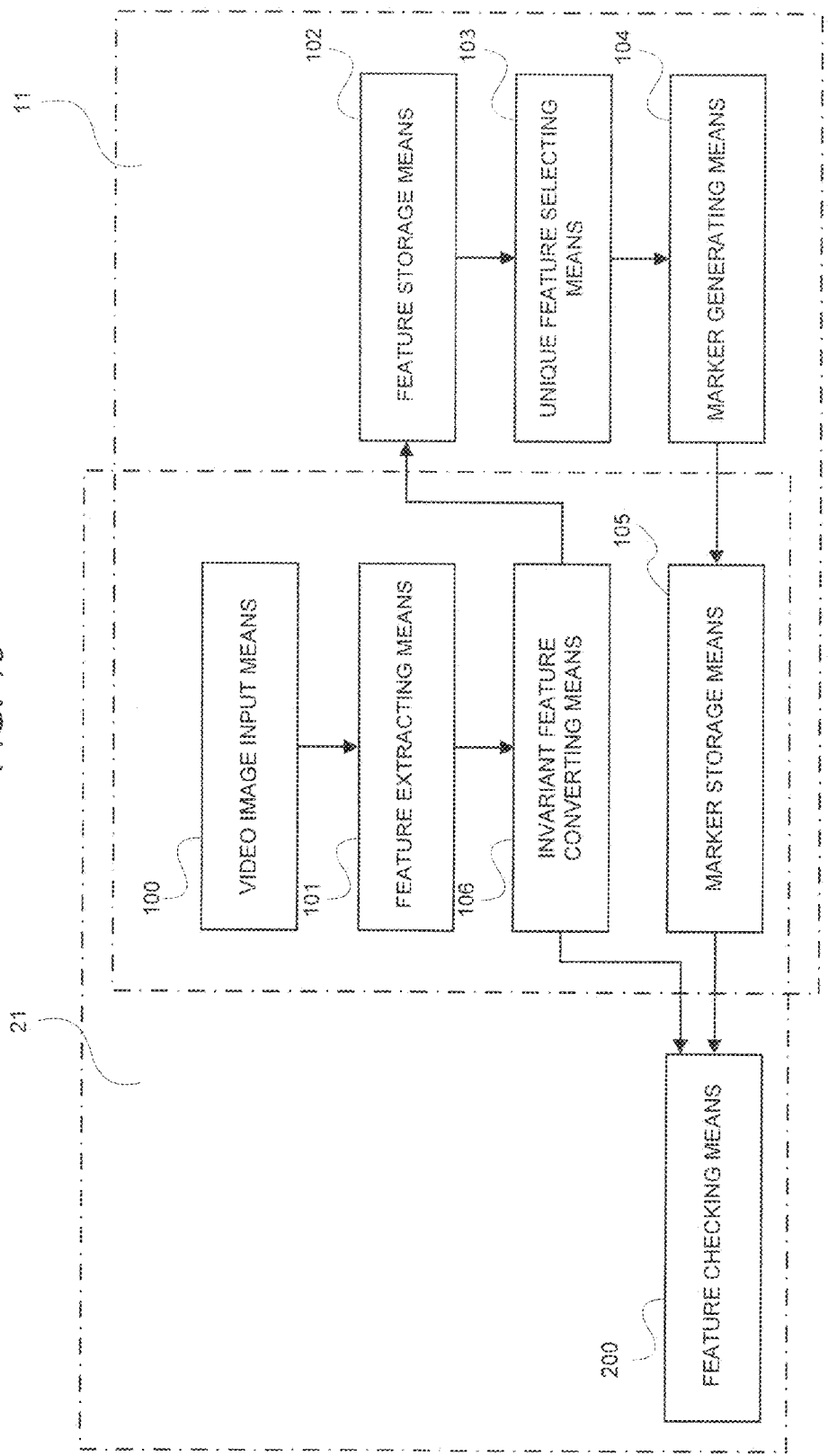
FIG. 19 A block diagram showing a configuration of third and fourth embodiments.

Referring to FIG. 19, the third embodiment relates to a graphic marker generating section 11, which is similar to the graphic marker generating section 10 in the first embodiment except that an invariant feature converting means 106 is included.

In the graphic marker generating section 11, the invariant feature converting means 106 generally operates in a manner as described below.

The invariant feature converting means 106 converts a feature output by the feature extracting means 101 into an invariant feature and outputs it to the feature storage means 102.

The other means 100, 101, 102-105 operate similarly to those in the first embodiment.

Next, an operation of the present embodiment will be explained in detail with reference to FIG. 19 and the flow chart in FIG. 20.

Figure 20:
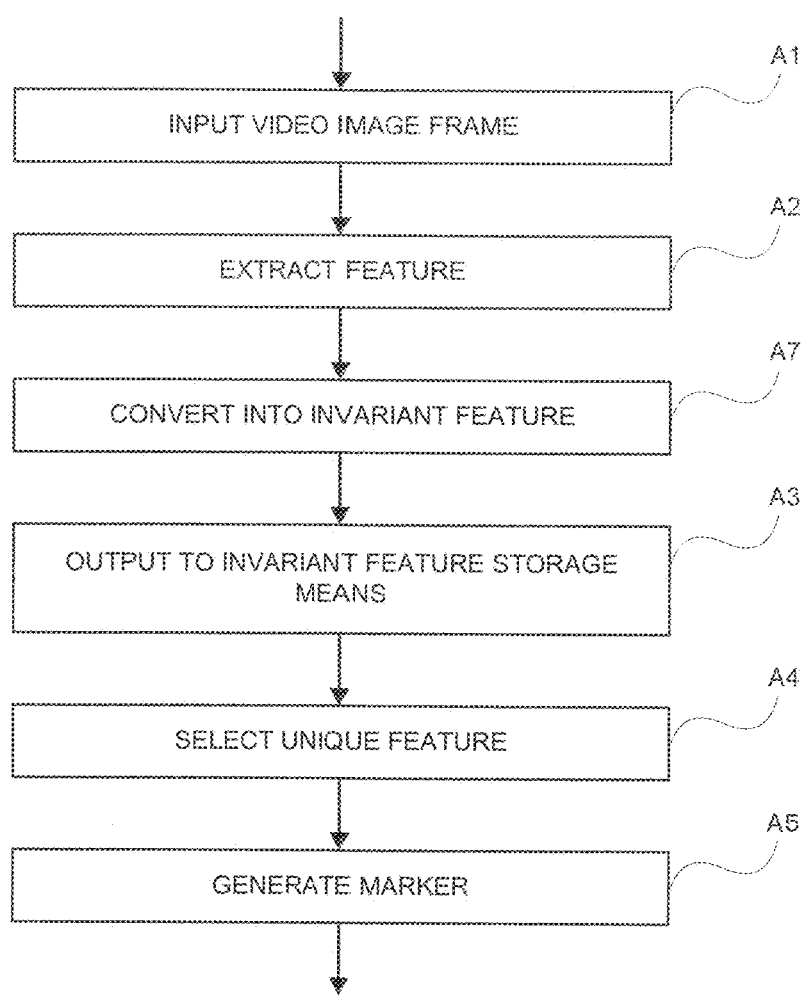
FIG. 20 A flow chart showing an operation of the third embodiment.

First, as for the graphic marker generating section 11, Steps A1 and A2 in FIG. 20 operate on a video image scene for which a marker is generated similarly to those in the first embodiment.

The resulting feature is converted into an invariant feature (Step A7). A feature output by the feature extracting means 101 is converted into an invariant feature, which is output to the feature storage means 102. When a distinctive segment in an image is extracted and a series of position coordinate information on that image is defined as a graphical feature, conversion thereof into an invariant feature may be conducted in a manner as described below, for example. For convenience, the series of position coordinate information will be referred to as feature point groups herein. For simplification, a geometrical invariant feature in a far-away background will be explained. However, consideration should be given so that a feature quantity is invariant even when an effect of optical distortion may cause shear deformative distortion in the image. It should be noted that it is easy to extend an invariant feature to that having a higher degree of freedom in a case that a background is not far away, which will be described later. An exemplary method of generating a geometrical invariant feature from the positional relationship of the feature point groups will now be explained, wherein the geometrical invariant feature is a feature quantity that is invariable irrespective of variation in relative positional relationship resulting in shear deformative distortion when a camera and a scene to be imaged are rotated and translated relative to each other.

Figure 5:
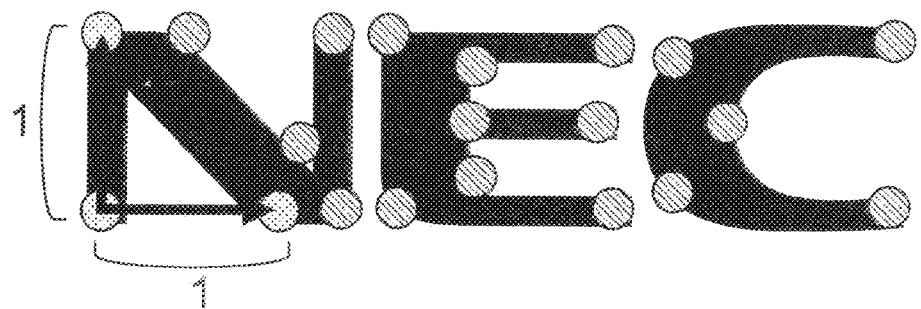
FIG. 5 A schematic diagram for explaining the present invention.
Figure 22:
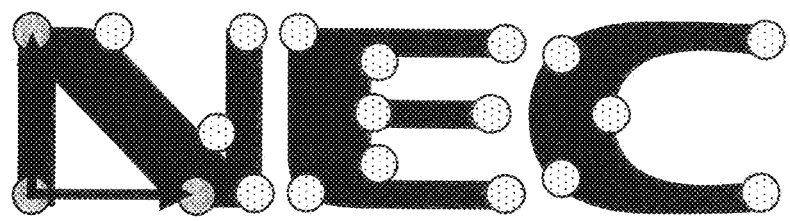
FIG. 22 A schematic diagram for explaining the present invention.
Figure 23:
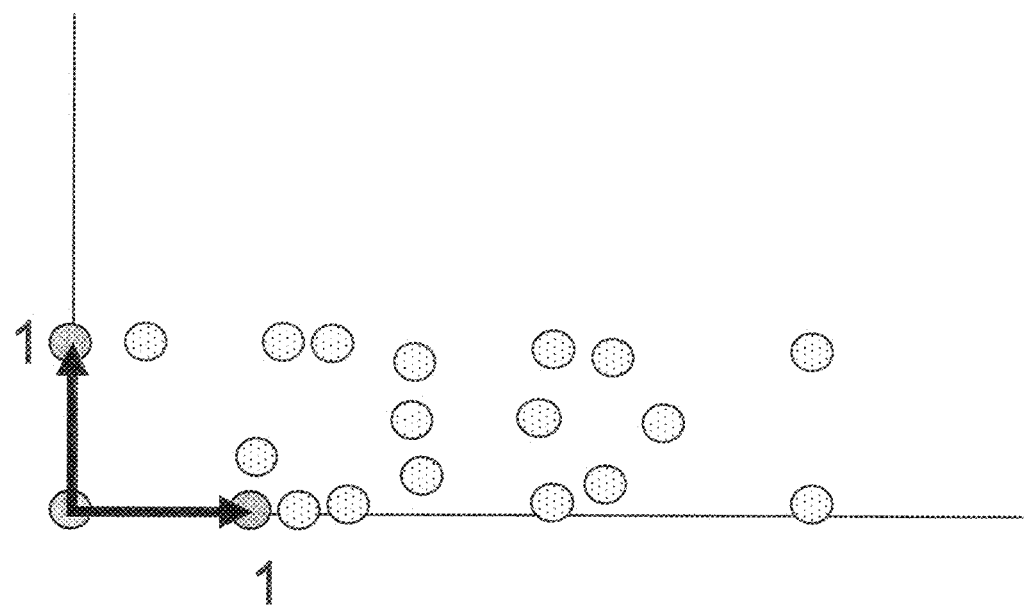
FIG. 23 A schematic diagram for explaining the present invention.

Three arbitrary feature points (green ○ in FIG. 22) are selected from the feature point groups (○ in FIG. 5). On the other hand, an invariant feature space is defined as a two-dimensional plane spanned by two orthogonal axes (FIG. 23). One of the feature points selected from the feature point groups is associated with an origin in the invariant feature space. Two other points are associated with position coordinates (1, 0) and (0, 1), respectively, in the invariant feature space (green ○ in FIG. 23). These three points will be referred to as bases hereinbelow. At that time, a one-to-one linear map from the original image space to the invariant feature space may be defined as an affine transform. All feature point groups except the bases are mapped onto the invariant feature space using the same affine transform characterized by the bases (red ○ in FIG. 23), whereupon these feature point groups are invariant irrespective of the relative positional relationship between the camera and scene. In practice, however, since not always the same bases can be selected from the scene, it is necessary to select bases from all permutations and combinations of three of the feature point groups, and map non-basis feature points with respect to each basis onto the invariant feature space.

Figure 24:
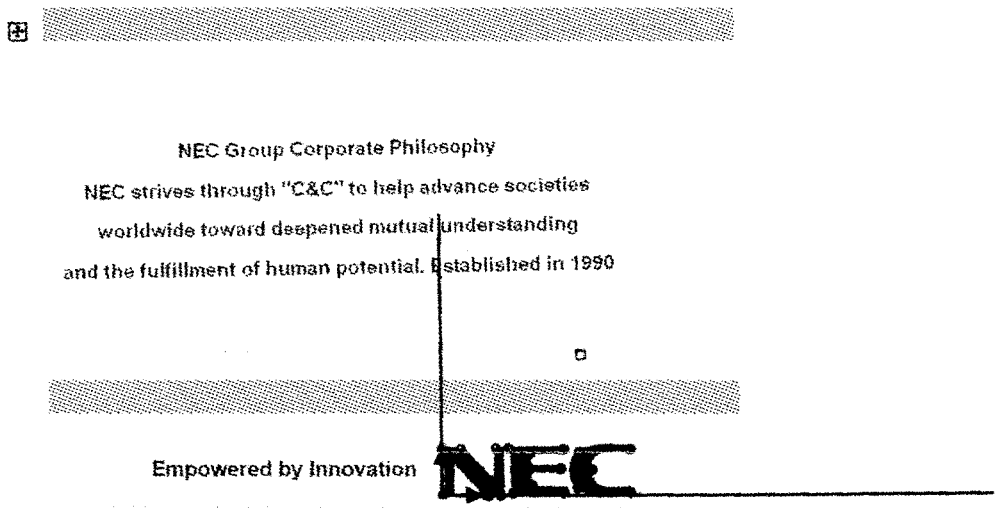
FIG. 24 A schematic diagram for explaining the present invention.
Figure 25:
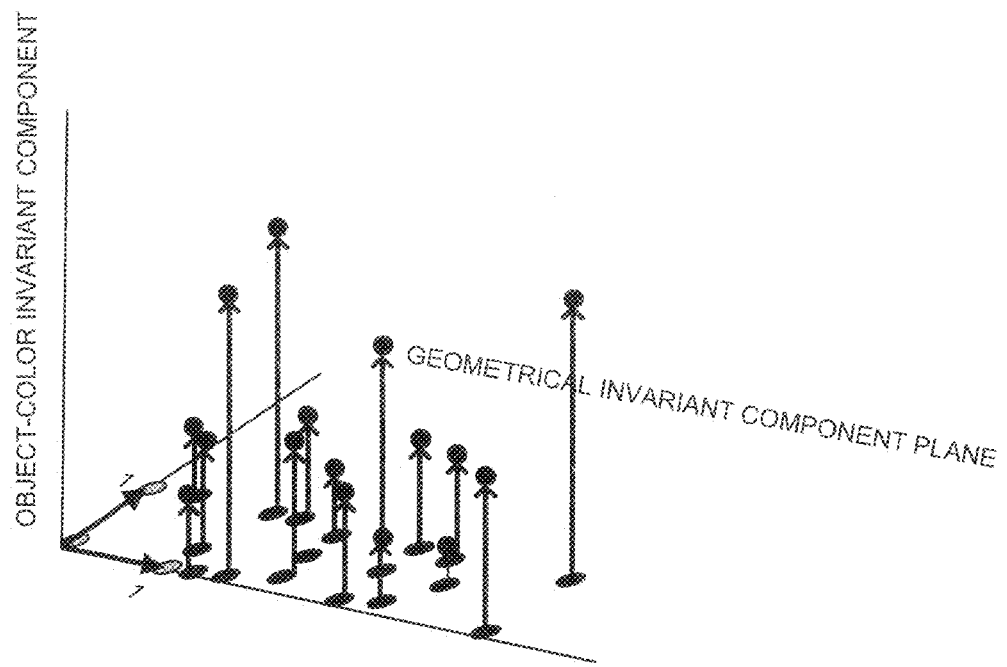
FIG. 25 A schematic diagram for explaining the present invention.

All the thus-created bases and maps of all feature points onto the invariant feature space are output to and stored in the invariant feature storage section as invariant features (Step A4). The reason why these feature point groups are invariant against geometrical deformation is that bases selected from the marker cause the resulting invariant feature to always match (FIG. 24) in a video image containing other objects (FIG. 7).

Upon completion of recording of a series of invariant feature (Step A3), Steps A4 and A5 thereafter operate similarly to those in the first embodiment.

While the above description of the operation at Step 7 has been made on a geometrical invariant, several kinds of invariants other than the geometrical invariant may be used. Examples of the invariants applicable in the present invention include an object-color invariant, which will be explained hereinbelow. The color of an object may vary in imaging even the object is the same, depending upon the color of the light source present in the imaging environment. If an effect of variation in light source color can be separated out from an image, an actual object color would be obtained. The resulting actual object color may be used as an object-color invariant. A portion exhibiting specular reflection is principally affected by the light source color and the brightness value tends to saturation for the light source color component, so that the component may be regarded as the light source color to prevent the color component corresponding to the saturated portion from being selected as an invariant feature. Besides, methods of estimating an object color from an image that may be employed include a method by Robby T. Tan and Katsushi Ikeuchi, disclosed in "Separating Reflection Components of Textured Surfaces Using a Single Image," IEEE Transactions on Pattern Analysis and Machine Intelligence, Vol. 27, No. 2, February 2005, pp. 178-193; and a method by Graham D. Finlayson, Steven D. Hordley, Cheng Lu, and Mark S. Drew, disclosed in "On the Removal of Shadows from Images," IEEE Transactions on Pattern Analysis and Machine Intelligence, Vol. 28, No. 1, January 2006, pp. 59-68.

Next, an example of a texture invariant will be explained. A brightness distribution for a partial region in an image is subjected to numerical computation, and the resulting numeric value or vector is defined as a feature quantity. Similarly to the graphical invariant, the texture invariant is susceptible to an effect of the relative positional relationship between the camera and subject to be imaged, and therefore, a feature quantity insusceptible to the effect is calculated and defined as a texture invariant. For example, a feature quantity invariable against the distance between the camera and the object or zoom may be implemented by converting a partial image of interest into polar coordinates, and taking a power spectrum in the radius-vector direction. Moreover, a power spectrum may be determined again with respect to the first power spectrum in the azimuthal direction to obtain a feature quantity that is invariable against rotation around an optical axis of the camera. Besides, a method by Chi-Man Pun and Moon-Chuen Lee disclosed in "Log-Polar Wavelet Energy Signatures for Rotation and Scale Invariant Texture Classification," IEEE Transactions on Pattern Analysis and Machine Intelligence, Vol. 25, No. 5, May 2003, may be employed.

Furthermore, for the geometrical invariant, another kind of a geometrical invariant such as that by Richard Hartley and Andrew Zisserman disclosed in "Multiple View Geometry in Computer Vision" may be employed. When the same scene is observed by a plurality of cameras, the method disclosed in this textbook enables acquisition of information on the distance or relative positional relationship in the depth direction, wherein four points lying in non-identical planes may be selected as bases, and assuming that an invariant space in FIG. 23 is three-dimensional, a three-dimensional geometric invariant may be created. At that time, a conversion map is determined in which one of four bases selected from feature point groups is associated with an origin of an invariant space, and feature points of the other bases are associated with position coordinates (1, 0, 0), (0, 1, 0) and (0, 0, 1) in the invariant space, and the conversion map is used to map the other features onto the invariant space.

Moreover, two or more kinds of these and other invariants may be employed in combination. The conversion from a feature into an invariant feature (Step A7) and selection of a unique feature (Step A4) therefrom in this case generally operate in a manner as described below.

An exemplary operation in which the aforementioned geometrical invariant and object-color invariant are employed in combination will be illustrated.

The geometrical invariant is assumed to be similar to that used in the above description of the operation at Step A7 (FIG. 23). The object-color invariant employed is assumed to be the brightness value of an object color obtained by the aforementioned method by Tan, et al. for neighboring pixels of the feature point groups extracted in determining the geometrical invariant. First, similarly to the aforementioned procedure for determining a geometrical invariant, three points are selected as bases from the feature point groups, and projected onto a geometrical invariant space described in a two-dimensional plane. An object-color invariant corresponding to each feature position is determined, and a three-dimensional space including an axis orthogonal to the geometrical invariant plane, that is, an object-color invariant coordinate, is assumed. The axes of the three-dimensional space are quantized and divided into rectangular parallelepiped mesh cells having a predefined size, and a histogram for each rectangular parallelepiped is generated. Similar calculation is performed on all combinations of the bases, and values of centers of mesh cells having a histogram of zero is defined as a unique feature (Step A4). Generation of a marker (Step A5) may be achieved by generating the marker with a position and color corresponding to each unique feature.

<Fourth Embodiment>

Next, a fourth embodiment of the present invention will be explained in detail with reference to the accompanying drawings.

Referring to FIG. 19, the embodiment of the present invention relates to a graphic marker detecting section 21, which is similar to the graphical marker detecting section 20 in the second embodiment except that an invariant feature converting means 106 is included.

Now the graphic marker detecting section 21 of the present invention will be explained in detail with reference to FIG. 19. The present embodiment relates to a method of detecting a marker pattern from a scene.

The present embodiment relates to the graphic marker detecting section 21 and is characterized in comprising the marker detecting section 21, which is in turn characterized in comprising: video image input means 100, feature extracting means 101, invariant feature converting means 106, marker storage means 105, and feature checking means 200.

These means generally operate in a manner as described below.

The video image input means 100, feature extracting means 101 and invariant feature converting means 106 operate similarly to those in the aforementioned embodiments.

The marker storage means 105 stores therein marker patterns generated beforehand. When a marker generated by the graphic marker generating section 11 is used, the marker pattern generated by the marker generating means 104 is input and stored.

The feature checking means 200 checks with a marker pattern stored in the marker storage means 105, and notifies detection of a marker when a match is found.

Next, an overall operation of the present embodiment will be explained in detail with reference to FIG. 19 and the flow chart shown in FIG. 21.

Figure 21:
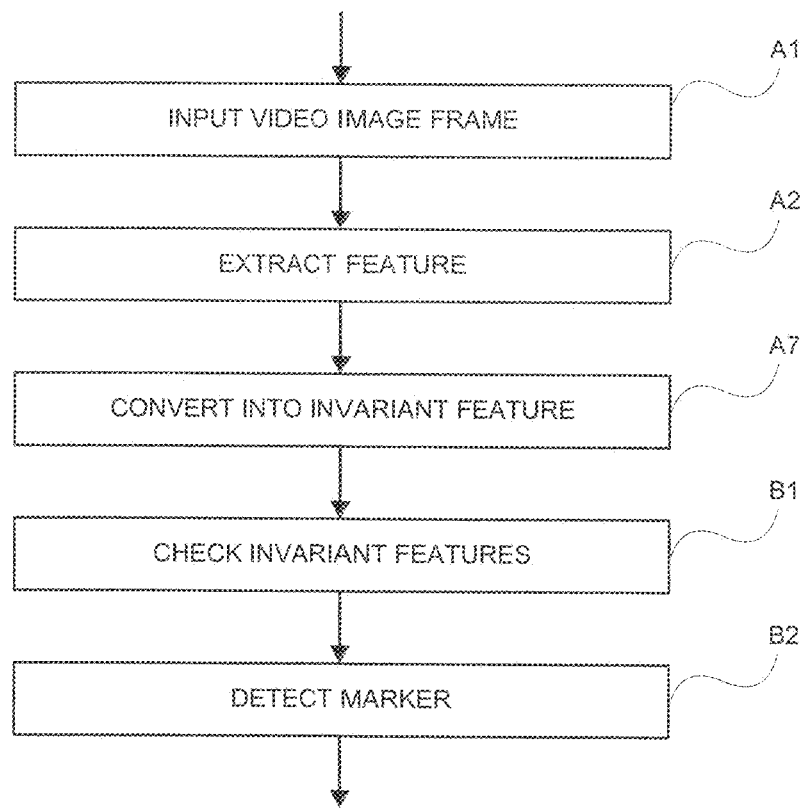
FIG. 21 A flow chart showing an operation of the fourth embodiment.

First, Steps A1, A2, A7 in FIG. 21 operate on a video image scene from which a marker is to be detected similarly to those in the embodiment of the graphic marker generating section 11.

Invariant features generated from a video image scene are checked with a marker pattern stored beforehand in the marker storage means 105 (Step B1). The marker pattern is converted into an invariant feature beforehand. Checking with the invariant feature generated from an actual video image scene is performed in the invariant feature space. For example, in a case that one of invariant features of the marker pattern and one of invariant features generated from the video image scene have an Euclidean distance equal to or smaller than a predefined value in the invariant feature space, the invariant features may be regarded as a match and the accumulated number of matched invariant features may be defined as a score.

Moreover, when the result of checking with the marker pattern satisfies a predefined condition, a notification that the marker pattern is found from the video image scene is generated (Step B2).

When employing the aforementioned example, marker detection may be acknowledged in a case that the score exceeds a predefined value, or a condition that an accumulated value of the aforementioned Euclidean distance is equal to or smaller than a predefined value may be additionally incorporated. As described above in the first and second embodiments, when determination of a unique feature is performed in a quantized feature space, the unique feature may be stored, and in a case that a feature from the video image scene is projected even once onto a mesh cell having a frequency of zero in designing a marker, it may be regarded as contribution from the marker pattern to confirm detection, whereby marker detection can be quickly achieved. To avoid misassociation due to noise or an error in feature extraction calculation, the frequency of projection to be acknowledged may be defined as a predefined value of one or more. Alternatively, when a similar quantized invariant feature space can be generated from a marker pattern, it may be employed. In this case, marker pattern detection may be acknowledged when an invariant feature obtained from the video image scene matches with an invariant space mesh to which the marker pattern is projected once or a predefined number of times.

Next, effects of the third and fourth embodiments will be explained.

In addition to the effects of the first and second embodiments, the third and fourth embodiment are configured to design a marker by performing observation through a geometrical invariant unaffected by geometrical distortion due to a positional relationship relative to an object, and designing the marker so that the geometrical invariant is dissimilar to a background pattern, and therefore, there is no possibility that the marker matches the background pattern by chance due to geometrical distortion, and in addition, marker detection can be achieved without any special consideration in detecting a marker depending upon variation in positional relationship with respect to an object by, for example, correcting geometrical distortion or making a match taking account of distortion.

Moreover, since the present embodiment is configured to design a marker by performing observation through a geometrical invariant unaffected by geometrical distortion due to a positional relationship relative to an object, and designing the marker so that the geometrical invariant is dissimilar to a background pattern, there is no possibility that the marker matches the background pattern by chance due to geometrical distortion, and in addition, marker detection can be achieved without any special consideration in detecting a marker depending upon variation in positional relationship with respect to an object by, for example, correcting geometrical distortion or making a match taking account of distortion.

Furthermore, since the present embodiment is configured to automatically generate a distinctive graphic pattern that is robust against variation in environment and unlikely to be confused with a background by obtaining statistic of a variety of invariants such as a geometrical invariant and an object-color invariant or texture invariant to determine a unique feature, detection can be stably achieved while reducing cost for disposing a marker.

<Fifth Embodiment>

Next, a fifth embodiment of the present invention will be explained in detail with reference to the accompanying drawings.

Figure 26:
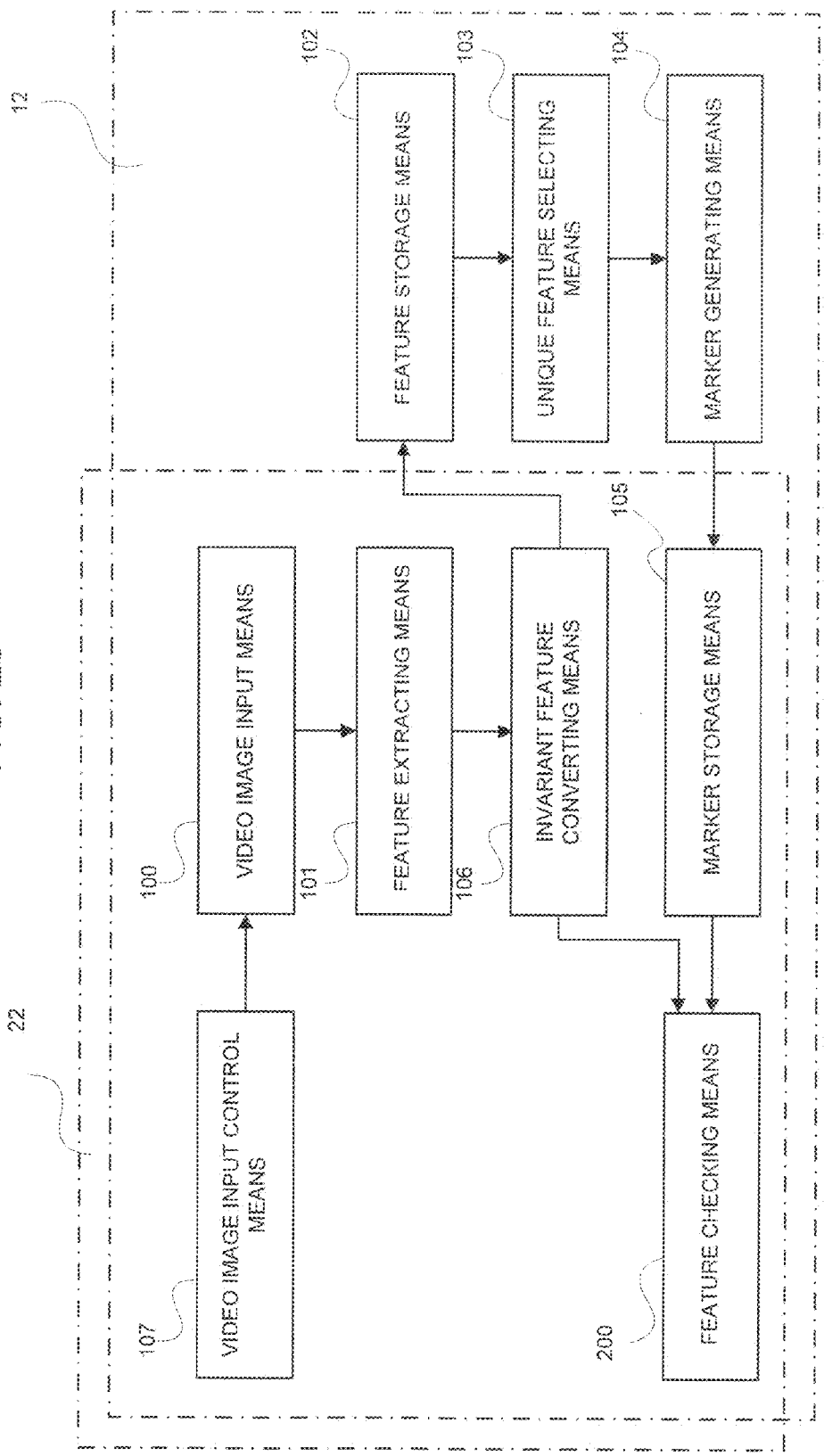
FIG. 26 A block diagram showing a configuration of fifth and sixth embodiments.

A graphic marker generating section 12 in the present embodiment will now be explained in detail with reference to FIG. 26. The present embodiment of the invention relates to a method of generating a marker pattern from a background scene, which is similar to the graphic marker generating section 11 in the first and third embodiments except that video image input control means 107 is included.

The video image input control means 107 generally operates in a manner as described below.

The video image input control means 107 gives the video image input means 100 a command to perform a video image input of a background video image for which a marker is to be generated at given start and end times and at given time intervals. The command may be manually given through this means. Thereafter, the video image input means 100, feature extracting means 101, invariant feature converting means 106, feature storage means 102, unique feature selecting means 103, marker generating means 104, and marker storage means 105 operate similarly to those in the aforementioned embodiments to generate one unique feature sequentially or generate a group of unique features for all images.

Next, an overall operation of the present embodiment will be explained in detail with reference to FIG. 26 and the flow chart shown in FIG. 27.

First, Steps A2 through A8 in FIG. 27 operate on a video image scene from which a marker is to be detected similarly to those in the first or third embodiment. However, input of a video image frame (Step A8) is made continuously or intermittently in response to the command from the video image input control means 107. Upon input of the frame, the steps perform processing similar to that in the first or third embodiment. Rather than outputting a unique feature on a frame-by-frame basis at Step A4, the unique feature may be stored in the invariant space, and a feature that is not observed from the background scene may be output as a unique feature as a result of observation over multiple frames.

Figure 29:
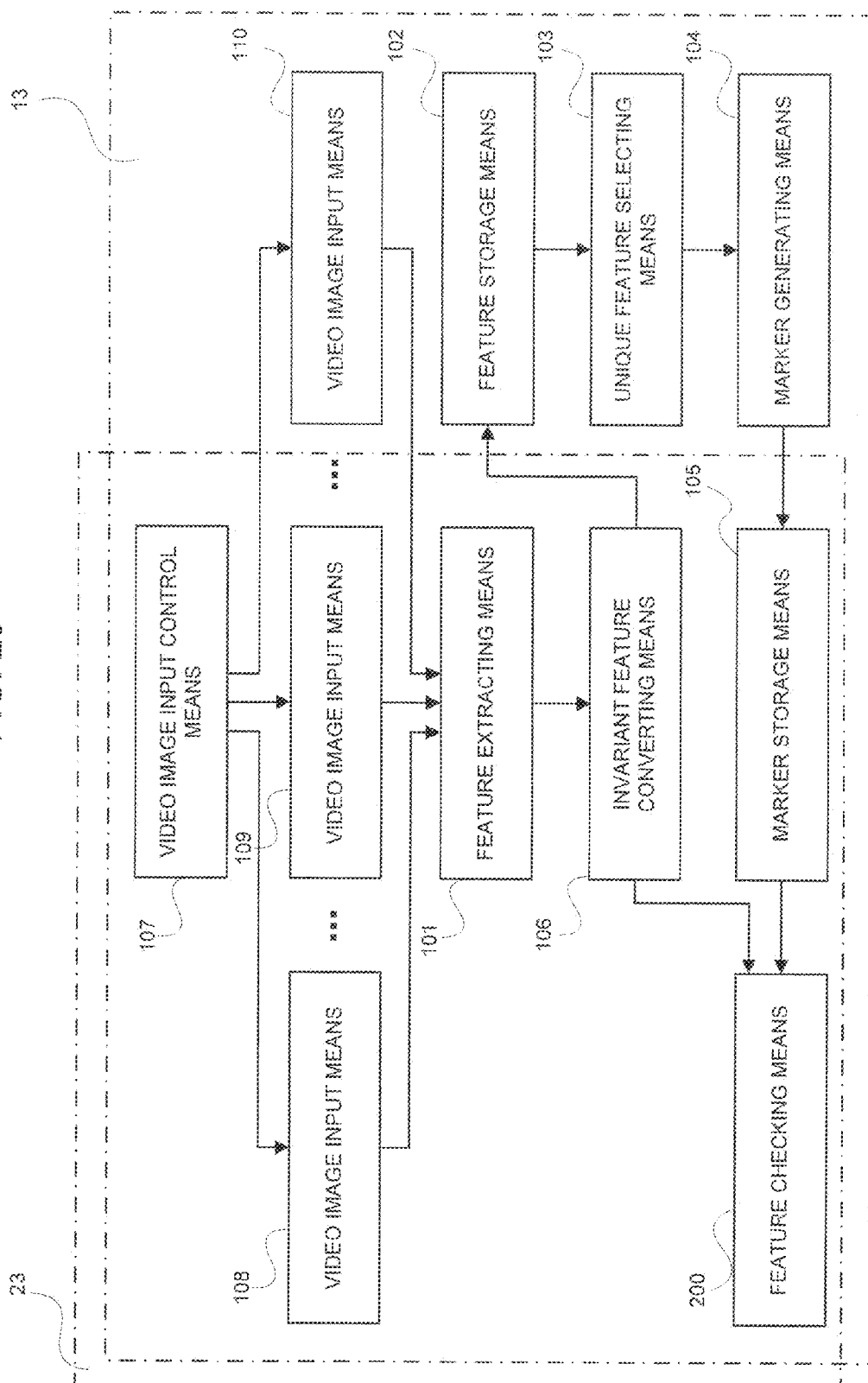
FIG. 29 A block diagram showing a variation of the fifth and sixth embodiments.

Alternatively, as shown in the block diagram illustrated in FIG. 29, a plurality of video image input means 108-110 may be employed to input a video image and perform a series of similar processing, or process video image frames in a time sequence from the plurality of video image input means 108-110. The video image input means 108-110 may support a mechanism allowing pan, tilt, zoom or moving. In this case, it is possible to perform a series of similar processing of selecting a unique feature while making angle view control for a camera.

Next, an effect of the fifth embodiment will be explained.

Since the unique feature and marker are generated according to observation over a long period of time or wide range or different angle views, robustness of the invariant feature can be enhanced. By sharing an invariant space by a plurality of video image frames in common, contribution is made to reduction in computational resources required in marker generation and detection processing. Even in a case that an object making a non-rigid motion such as a person or an animal is present in the background, it is possible to generate a stable marker by observation over a long period of time or multiple view angles.

<Sixth Embodiment>

Next, a sixth embodiment of the present invention will be explained in detail with reference to the accompanying drawings.

The graphic marker detecting sections 22, 23 of the present invention will be explained in detail with reference to FIGS. 26 and 29. The present invention relates to a method of detecting a marker pattern from a video image scene, and the present embodiment of the invention is similar to the graphic marker detecting section 11 in the first and third embodiments, except that video image input control means 107 is included. The same applies to the graphic marker detecting section 23 in FIG. 29, except that a plurality of video image input means 108-110 are included.

The video image input control means 107 gives the video image input means 100 a command to perform a video image input of a video image for which a marker is to be detected at given start and end times and at given time intervals. The command may be manually given through this means. Thereafter, the video image input means 100, feature extracting means 101, invariant feature converting means 106, marker storage means 105, and marker checking means 200 operate similarly to those in the aforementioned embodiments to detect one marker sequentially or detect a group of markers for all images.

Next, an overall operation of the present embodiment will be explained in detail with reference to FIG. 26, FIG. 29 and the flow chart shown in FIG. 28.

First, Steps A2 through B2 in FIG. 28 operate on a video image scene from which a marker is to be detected similarly to those in the second or fourth embodiment. However, input of a video image frame (Step A8) is made continuously or intermittently in response to the command from the video image input control means 107. Upon input of the frame, the steps perform processing similar to that in the first or third embodiment. Rather than generating a notification when a marker is detected from a certain frame at Step B1, circumstances of detection may be tracked, and only a marker observed in a plurality of scenes may be output as a result of observation over multiple frames.

Alternatively, as shown in the block diagram illustrated in FIG. 29, a plurality of video image input means 108-110 may be employed to input a video image and perform a series of similar processing, or process video image frames in a time sequence from the plurality of video image input means 108-110. The video image input means 108-110 may support a mechanism allowing pan, tilt, zoom or moving. In this case, it is possible to perform a series of similar processing of detecting a marker while making angle view control for a camera.

Next, an effect of the sixth embodiment will be explained.

Since marker detection is performed over a long period of time or wide range or different angle views, robustness of marker detection can be enhanced. By sharing the marker storage means for marker detection by a plurality of video image frames in common, contribution is made to reduction in computational resources required in marker detection processing. In a case that the marker is attached to an object making a non-rigid motion such as a person or an animal or a case that an object making a non-rigid motion is present in the background, it is possible to stably detect only the marker by observation over a long period of time or multiple view angles.

Example 2

Next, an operation of the best modes for carrying out the present invention will be explained with reference to a particular example.

Figure 30:
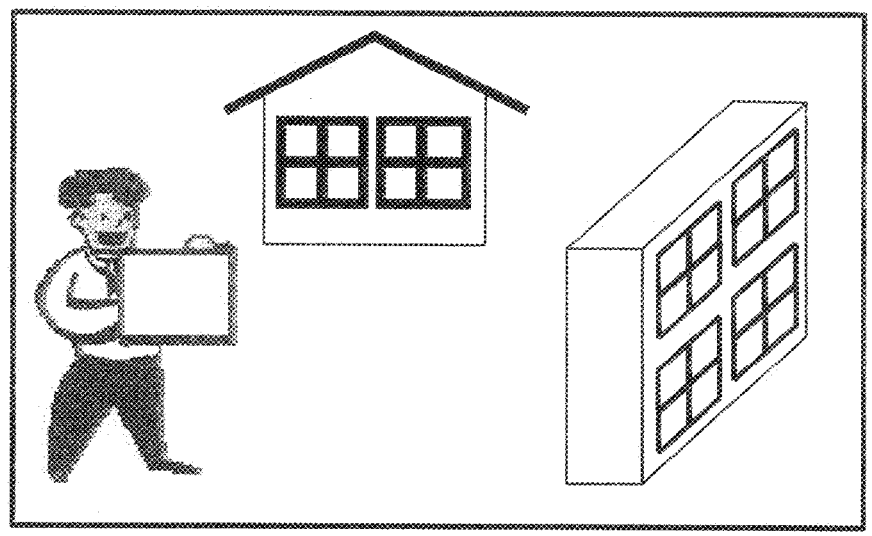
FIG. 30 A diagram for explaining an embodiment of the present invention.
Figure 31:
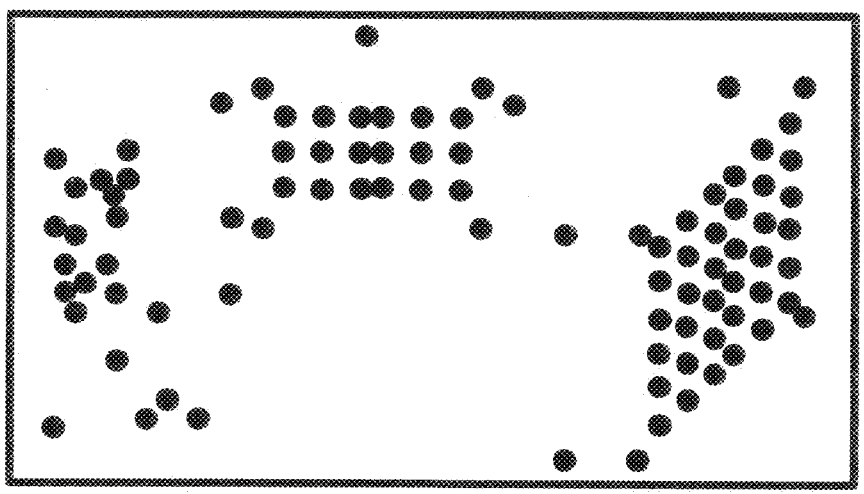
FIG. 31 A diagram for explaining an embodiment of the present invention.
Figure 32:
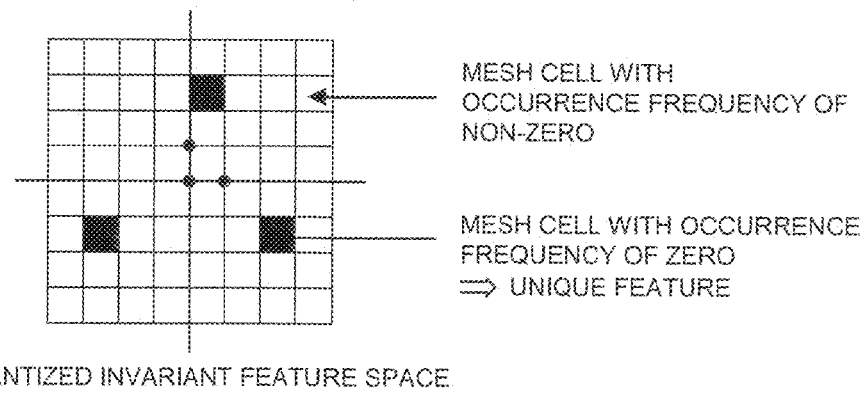
FIG. 32 A diagram for explaining an example of the present invention.
Figure 33:
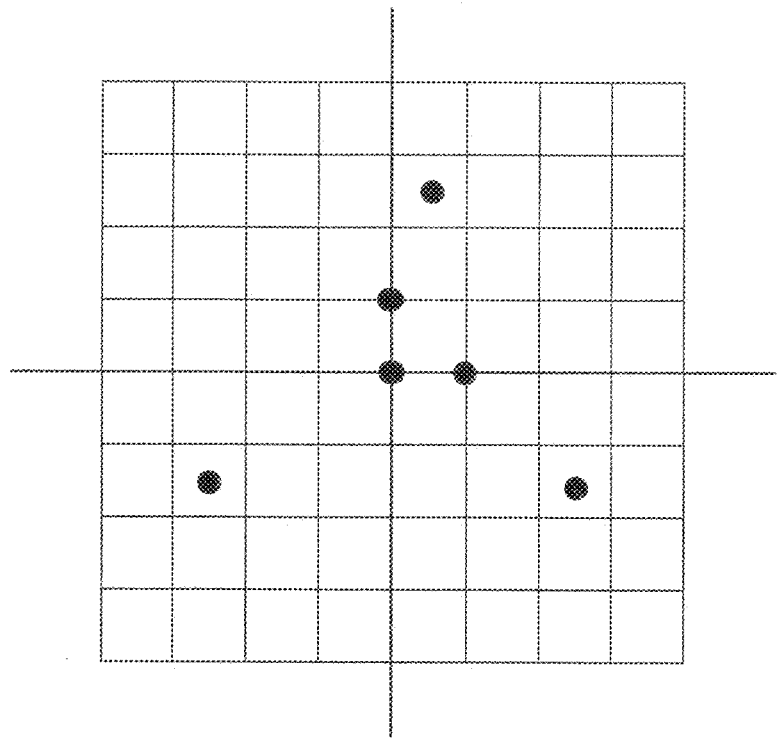
FIG. 33 A diagram for explaining the example of the present invention.
Figure 34:
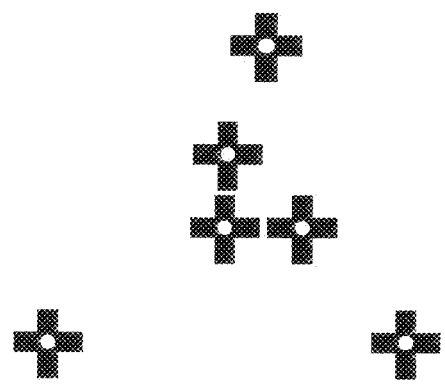
FIG. 34 A diagram for explaining the example of the present invention.
Figure 35:
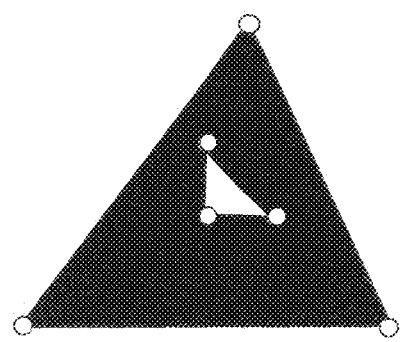
FIG. 35 A diagram for explaining the example of the present invention.
Figure 36:
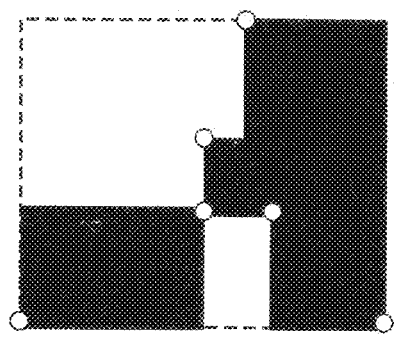
FIG. 36 A diagram for explaining the example of the present invention.
Figure 37:
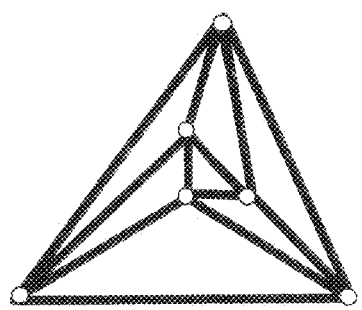
FIG. 37 A diagram for explaining the example of the present invention.

First, an operation of designing a marker will be particularly explained. For a video image scene as shown in FIG. 30, feature point groups as indicated by circles shown in FIG. 31 are generated. An exemplary operation of selecting a unique feature from a quantized invariant feature space will be explained hereinbelow. FIG. 32 shows a mesh having 8×8 cells obtained by mapping feature point groups onto an invariant space and quantizing the invariant space from the result. In FIG. 32, a non-filled mesh cell indicates an occurrence frequency of non-zero, that is, indicates that a projection of a feature point is present within the mesh cell, and a filled-in mesh cell indicates a mesh cell having an occurrence frequency of zero. According to the first embodiment, a unique feature is selected from the filled-in mesh cells. An example in which a center of a filled-in mesh cell is defined as a unique feature is shown in FIG. 33. In this example, bases in the invariant feature space, that is, points (0, 0), (1, 0), (0, 1) are included in the unique feature. However, the points may be excluded. Exemplary marker patterns are then generated from the resulting unique feature point groups according to the four generation methods explained in the first embodiment, which are shown in FIGS. 34-37.

Figure 38:
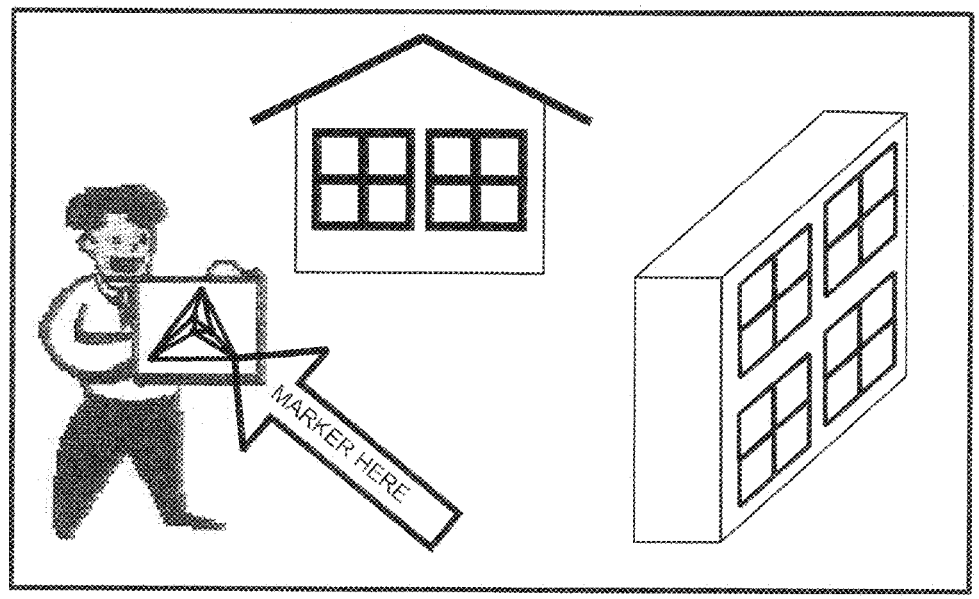
FIG. 38 A diagram for explaining the example of the present invention.
Figure 39:
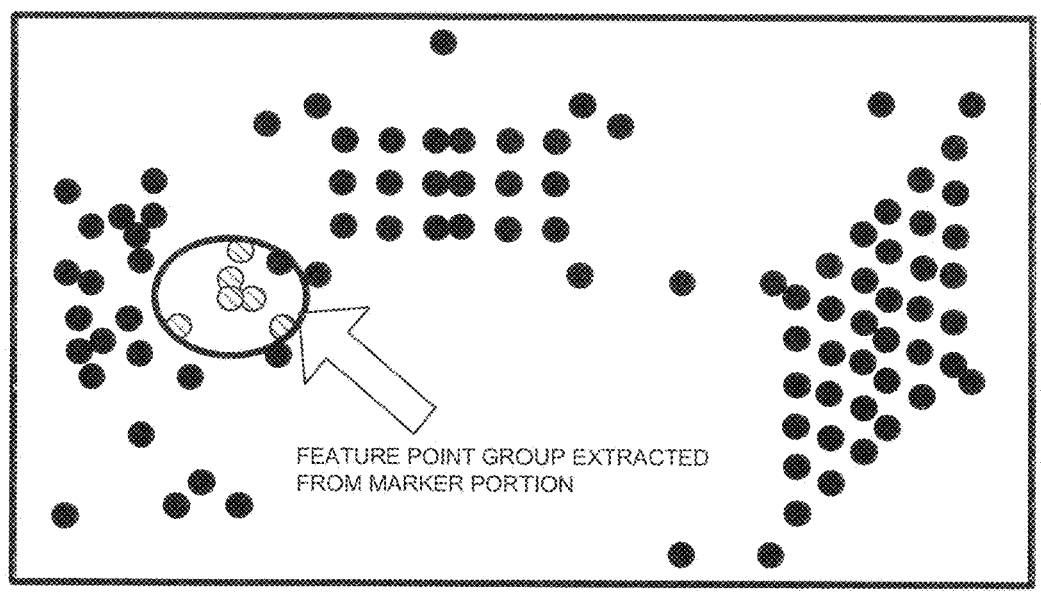
FIG. 39 A diagram for explaining the example of the present invention.
Figure 40:
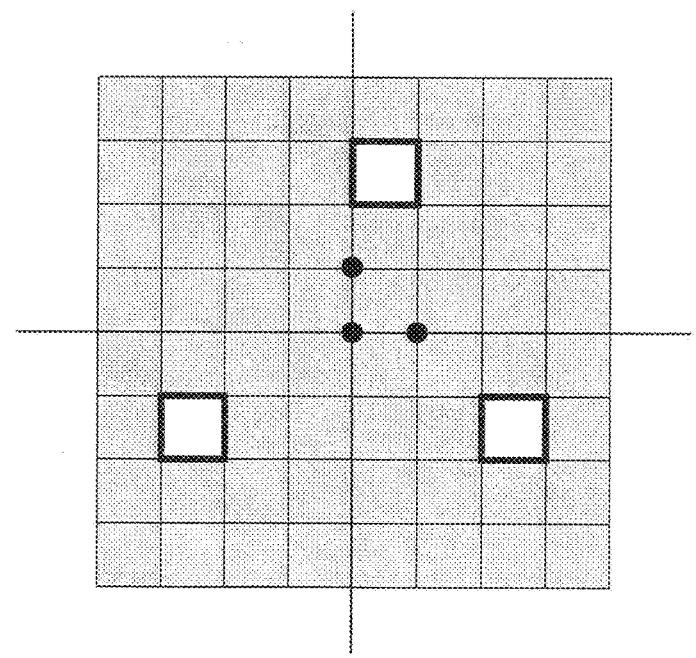
FIG. 40 A diagram for explaining the example of the present invention.
Figure 41:
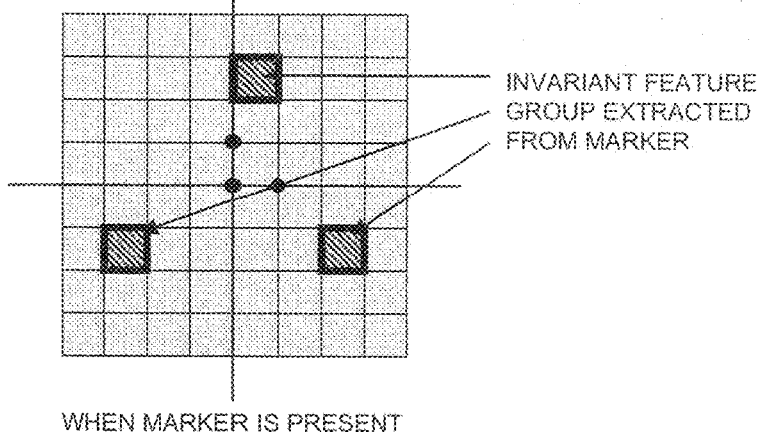
FIG. 41 A diagram for explaining the example of the present invention.

Next, an operation of marker detection will be particularly explained. The following description will be made on a procedure for quickly and stably detecting the marker shown in FIG. 37 from a video image scene including the marker as shown in FIG. 38. A result of feature extraction on this scene is shown in FIG. 39. Moreover, the result is mapped onto an invariant feature space and quantized to obtain a mesh having cells onto which feature points are mapped and filled, the result of which is shown in FIG. 41. In a case that the marker is not present, a map of the feature points is as shown in FIG. 40. Thus, in a case that feature points are present in mesh cells (a hatched portion in bold-line boxes in FIG. 41) in which no map would otherwise be present from the background, a decision that the marker is present may be made.

Figure 42:
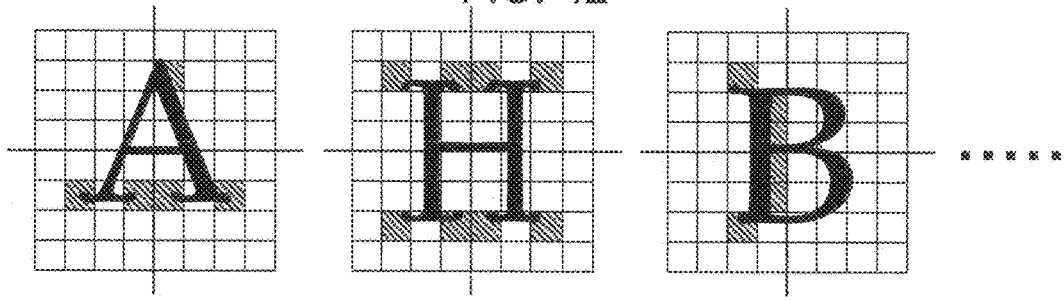
FIG. 42 A diagram for explaining the example of the present invention.
Figure 43:
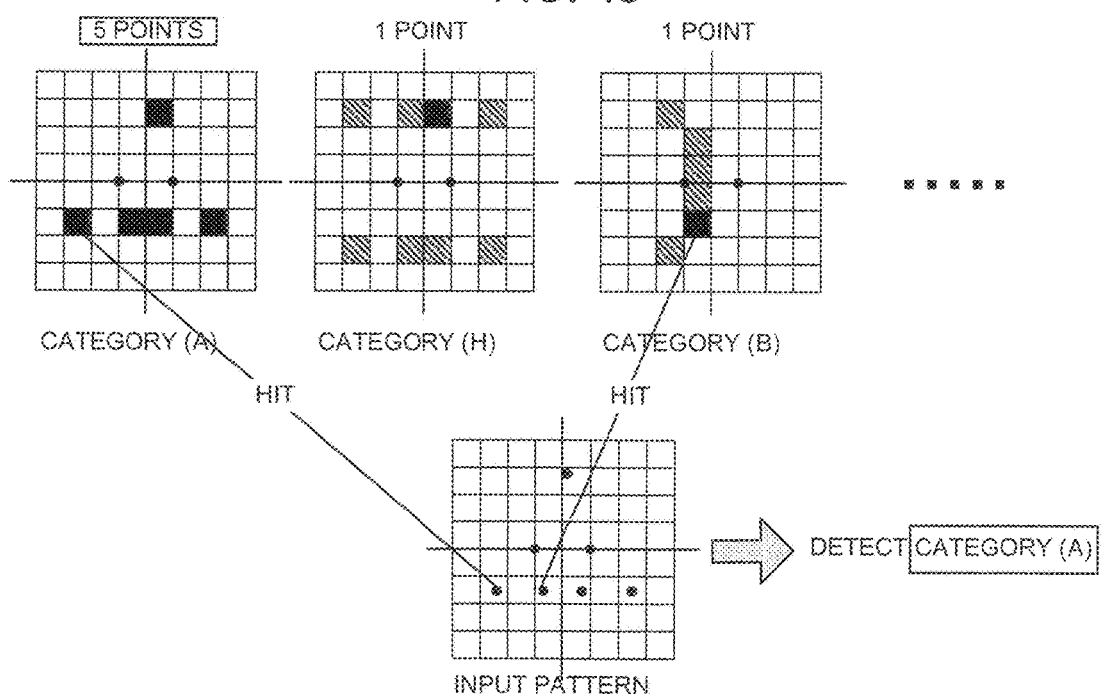
FIG. 43 A diagram for explaining the example of the present invention.

When a plurality of kinds of markers are used, the circles or hatched mesh cells in FIG. 42 may be stored corresponding to each marker pattern ("A," "H" and "B" are examples of markers), and a marker for which most similar maps, that is, a largest number of maps, are obtained near or at the mesh cells in detection may be employed as a result of detection (FIG. 43).

Next, another embodiment of the present invention will be explained.

Figure 44:
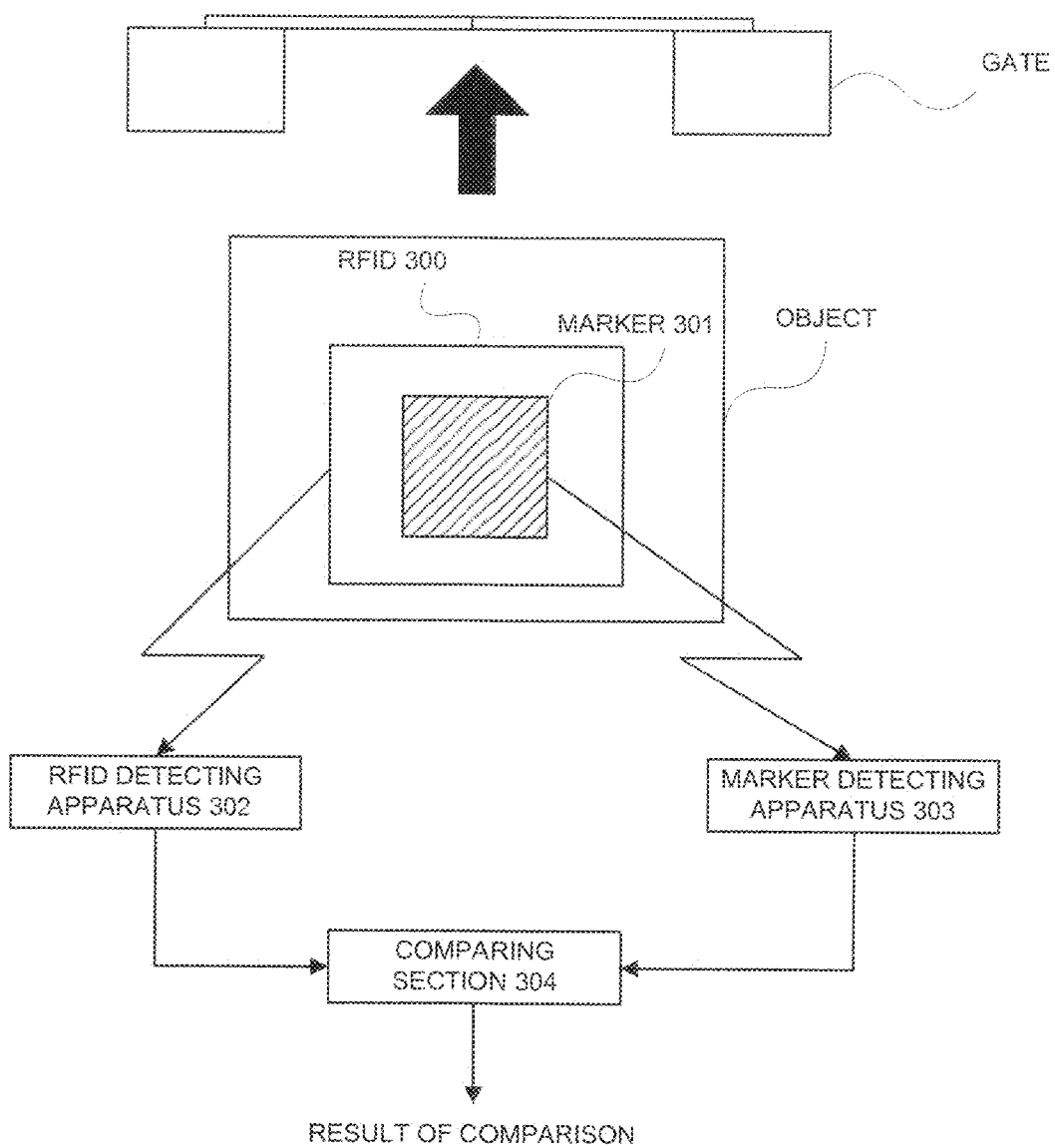
FIG. 44 A diagram for explaining another embodiment of the present invention.

In this embodiment, an example in which the technique for marker and detection according to the present invention is applied to a technique for detection of RFID will be explained. FIG. 44 is a diagram for explaining this embodiment.

RFID 300 is attached thereon with a marker 301 of the present invention. The RFID 300 is detected by an RFID detecting apparatus 302, and the marker 301 is detected by a marker detection apparatus 303 provided separately from the RFID detecting apparatus 302. It should be noted that the marker detection apparatus 303 has a configuration similar to that of the marker detecting section 20 as described above. A result of detection by the RFID detecting apparatus 302 and that by the marker detection apparatus 303 are input to a comparing section 304 to compare the results of detection.

When such a configuration is applied to logistics management with which articles passing through a predefined gate are managed, each article is attached with RFID 300 having a marker 301. The apparatus is configured to perform both detection of the RFID 300 by the RFID detecting apparatus 302 and detection of the marker 301 by the marker detection apparatus 303 as the article passes through the gate. Then, by comparing the results of detection with each other at the comparing section 304, accuracy in detection of the article can be improved. While a case in which the marker 301 is attached to the RFID 300 has been explained in the above example, the present invention is not limited thereto and the marker 301 and RFID 300 may be separately attached to the article, or wrapping paper for the article may be made as a marker according to the present invention and used as described above.

The present application claims priority based on Japanese Patent Application No. 2007-12134 filed on Jan. 23, 2007, and Japanese Patent Application No. 2008-3950 filed on Jan. 11, 2008, disclosures of which are incorporated herein in its entirety.

APPLICABILITY IN INDUSTRY

The present invention may be applied to fields of video image monitoring such as those represented by article management and physical security. It may also be applied to fields of robot vision, mixed reality UI, content generation, and the like.

The invention claimed is:

1. A marker detecting system for extracting as a feature a segment containing a distinctive pattern in a background video image not containing a marker in an environment in which detection of the marker is performed, selecting as a unique feature a portion having a frequency equal to or smaller than a predefined value from a frequency distribution of the features, the unique feature does not appear in said background video image, and detecting a marker generated based on said unique feature, comprising:
    a storage unit for storing the unique feature of said marker; and
    at least one processor configured to check the unique feature in the video image subjected to detection, which contains said marker in an environment in which detection of a marker is performed, with the unique feature of said marker, and notify detection of the marker when a match of the unique features is found.

2. The marker detecting system according to claim 1, further comprising:
    a video image input unit to input a video image subjected to detection; and
    the at least one processor is configured to provide start and end times at which a video image is input to said video image input unit, and a time at which imaging is performed, and check the unique feature in the video image subject to detection with the unique feature of the marker in the storage unite according to the video image is input, and generates a notification when checking is succeeded at a frequency equal to or greater than a predefined number of times.

3. The marker detecting system according to claim 1, wherein a feature space in a mesh having a particular cell size, generates a one-dimensional or multi-dimensional histogram, and defines centers of mesh cells with a frequency of zero as the unique feature.

4. The marker detecting system according to claim 3, wherein if no mesh cell with a frequency of zero is found, threshold processing is applied to the histogram by using a predefined value to select the unique feature from mesh cells having a value less than or equal to the predefined value.

5. The marker detecting system according to claim 1, wherein the marker has a marker pattern selected from:

(1) a pattern having intersections positioned at the position of the unique feature;
(2) a pattern generated by repeating an operation of finding a convex hull of a unique feature and filling its inside with a specific color, and finding another convex hull again using a unique feature that is not used in the first convex hull and filling its inside with another color, until all features are selected;
(3) a pattern formed of a set of filled-in rectangles having vertices lying at the position of the unique feature and having horizontal and vertical sides; and
(4) a pattern in which nearest neighbor ones of unique feature points are connected by line segments.

6. A marker detecting method for extracting as a feature a segment containing a distinctive pattern in a background video image not containing a marker in an environment in which detection of a marker is performed, selecting as a unique feature a portion having a frequency equal to or smaller than a predefined value from a frequency distribution of the features, the unique feature does not appear in said video image, and detecting a marker generated based on said unique feature, comprising:
    checking the unique feature in a video image subjected to detection, which contains said marker in an environment in which detection of the marker is performed, with the unique feature of said marker stored in a memory, and notifying detection of the marker when a match of the unique features is found.

7. The marker detecting method according to claim 6, further comprising:
    checking the unique feature in the video image subjected to detection, which contains the marker in an environment in which detection of the marker is performed, with the unique feature of the marker input in the memory; and
    generating a notification when checking is succeeded at a frequency equal to or greater than a predefined number of times.

8. A non-transient computer readable recording medium on which is stored, a program for marker detection, for extracting as a feature a segment containing a distinctive pattern in a background video image not containing a marker in an environment in which detection of a marker is performed, selecting as a unique feature a portion having a frequency equal to or smaller than a predefined value from a frequency distribution of the features, the unique feature does not appear in said background video image, and detecting a marker generated based on said unique feature, said program causing an information processing apparatus to execute the processing of:
    checking the unique feature in a video image subjected to detection, which contains said marker in an environment in which detection of the marker is performed, with the unique feature of said marker stored in a memory, and notifying detection of the marker when a match of the unique features is found.

9. The computer-readable recording medium according to claim 8, the program further causing an information processing apparatus to execute the processing of:
    Checking the unique feature in the video image subjected to detection, which contains the marker in an environment in which detection of the marker is performed, with the unique feature of the marker in the memory; and
    generating a notification which checking is succeeded at a frequency equal to or greater than a predefined number of times.

10. The computer-readable recording medium according to claim 8, wherein a feature space in a mesh having a particular cell size, generates a one-dimensional or multi-dimensional histogram, and defines centers of mesh cells with a frequency of zero as the unique feature.

11. The computer-readable recording medium according to claim 10, wherein if no mesh cell with a frequency of zero is found, threshold processing is applied to the histogram by using a predefined value to select the unique feature from mesh cells having a value less than or equal to the predefined value.

12. The computer-readable recording medium according to claim 8, wherein the marker has a marker pattern selected from:
   (1) a pattern having intersections positioned at the position of the unique feature;
   (2) a pattern generated by repeating an operation of finding a convex hull of a unique feature and filling its inside with a specific color, and finding another convex hull again using a unique feature that is not used in the first convex hull and filling its inside with another color, until all features are selected;
   (3) a pattern formed of a set of filled-in rectangles having vertices lying at the position of the unique feature and having horizontal and vertical sides; and
   (4) a pattern in which nearest neighbor ones of unique feature points are connected by line segments.

\* \* \* \* \*